United States Patent
Yang et al.

(10) Patent No.: US 12,301,314 B2
(45) Date of Patent: *May 13, 2025

(54) APPARATUS, SYSTEM AND METHOD OF COMMUNICATING A SINGLE-USER (SU) MULTIPLE-INPUT-MULTIPLE-OUTPUT (MIMO) TRANSMISSION

(71) Applicant: INTEL CORPORATION, Santa Clara, CA (US)

(72) Inventors: Ou Yang, Santa Clara, CA (US); Carlos Cordeiro, Portland, OR (US); Cheng Chen, Portland, OR (US); Oren Kedem, Modiin Maccabim-Reut (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/318,334

(22) Filed: May 16, 2023

(65) Prior Publication Data
US 2023/0327716 A1    Oct. 12, 2023

Related U.S. Application Data

(63) Continuation of application No. 18/079,593, filed on Dec. 12, 2022, now Pat. No. 12,166,543, which is a
(Continued)

(51) Int. Cl.
*H04W 72/04* (2023.01)
*H04B 7/0413* (2017.01)
(Continued)

(52) U.S. Cl.
CPC ......... *H04B 7/0413* (2013.01); *H04L 5/0055* (2013.01); *H04W 72/04* (2013.01); *H04W 74/04* (2013.01)

(58) Field of Classification Search
CPC .... H04B 7/0413; H04L 5/0055; H04W 72/04; H04W 74/04; H04W 74/0816
(Continued)

(56) References Cited

U.S. PATENT DOCUMENTS 11,165,470 B2 *  11/2021  Yang ................. H04W 74/0816
11,552,680 B2 *  1/2023   Yang ..................... H04W 72/04
(Continued)

FOREIGN PATENT DOCUMENTS

WO    2013055117    4/2013
WO    2013141672    9/2013
WO    2015034304    3/2015

OTHER PUBLICATIONS

Ou et al. ( IEEE 802.11-yy/xxxxr0, Dec. 12, 2016) (Year: 2016).*
(Continued)

*Primary Examiner* — Maharishi V Khirodhar
(74) *Attorney, Agent, or Firm* — Shichrur & Co.

(57) ABSTRACT

Some demonstrative embodiments include apparatuses, systems and/or methods of communicating a Single-User (SU) Multiple-Input-Multiple-Output (MIMO) transmission. For example, a first wireless communication station may be configured to transmit a Request to Send (RTS) to a second wireless communication station via a plurality of SU MIMO Transmit (Tx) sectors of the first wireless communication station, the RTS to establish a Transmit Opportunity (TXOP) to transmit an SU-MIMO transmission to the second wireless communication station, a control trailer of the RTS including an indication of an intent to transmit the SU-MIMO transmission to the second wireless communication station; and to transmit the SU-MIMO transmission to the second wireless communication station, upon receipt of a Clear to Send (CTS) from the second wireless communica-
(Continued)

tion station indicating that the second wireless communication station is ready to receive the SU-MIMO transmission.

20 Claims, 7 Drawing Sheets

Related U.S. Application Data continuation of application No. 17/030,948, filed on Sep. 24, 2020, now Pat. No. 11,552,680, which is a continuation of application No. 16/487,959, filed as application No. PCT/US2017/039850 on Jun. 29, 2017, now Pat. No. 11,165,470.

(60) Provisional application No. 62/464,672, filed on Feb. 28, 2017.

(51) Int. Cl.
*H04L 5/00* (2006.01)
*H04W 74/04* (2009.01)
*H04W 76/00* (2018.01)
*H04W 88/08* (2009.01)

(58) Field of Classification Search
USPC .......................................................... 370/329
See application file for complete search history.

(56) References Cited

U.S. PATENT DOCUMENTS

| | | |
|---|---|---|
| 12,166,543 B2 | 12/2024 | Yang et al. |
| 2008/0316987 A1 | 12/2008 | Trainin et al. |
| 2012/0099664 A1 | 4/2012 | Cheong et al. |
| 2013/0176921 A1 | 7/2013 | Chu et al. |
| 2014/0294109 A1 | 10/2014 | Cheong et al. |
| 2017/0222710 A1 | 8/2017 | Eitan et al. |
| 2019/0386714 A1 | 12/2019 | Yang et al. |
| 2023/0179266 A1 | 6/2023 | Yang et al. |
| 2023/0336214 A1* | 10/2023 | Yang ..................... H04W 72/04 |
| 2025/0023603 A1 | 1/2025 | Yang et al. |

OTHER PUBLICATIONS

Hansen ("Draft text for EDMG Capabilities", IEEE 802.11-16/1626r0, Dec. 15, 2016) (Year: 2016).*
Office Action for U.S. Appl. No. 18/079,593, mailed on Feb. 22, 2024, 53 pages.
Yang et al. (MIMO channel access, IEEE 802.11-yy/xxxxr01, Dec. 12, 2016) (Year: 2016), 3 pages.
Yang et al. (MIMO channel access, IEEE 802.11-yy/xxxxr02, Dec. 12, 2016) (Year: 2016), 6 pages.
International Search Report and the Written Opinion for International Application No. PCT/US2017/039850, mailed on Nov. 17, 2017, 12 pages.
IEEE Std 802.11™-2016. IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016, 3534 pages.
International Preliminary Report on Patentability for International Application No. PCT/US2017/039850, mailed on Sep. 12, 2019, 9 pages.
Office Action for U.S. Appl. No. 16/487,959, mailed on Feb. 22, 2021, 43 pages.
Notice of Allowance for U.S. Appl. No. 16/487,959, mailed on Jun. 30, 2021, 14 pages.
Office Action for U.S. Appl. No. 17/030,948, mailed on May 5, 2022, 36 pages.
Notice of Allowance for U.S. Appl. No. 17/030,948, mailed on Sep. 9, 2022, 5 pages.
Office Action for U.S. Appl. No. 18/213,101, mailed on Aug. 14, 2024, 26 pages.

* cited by examiner

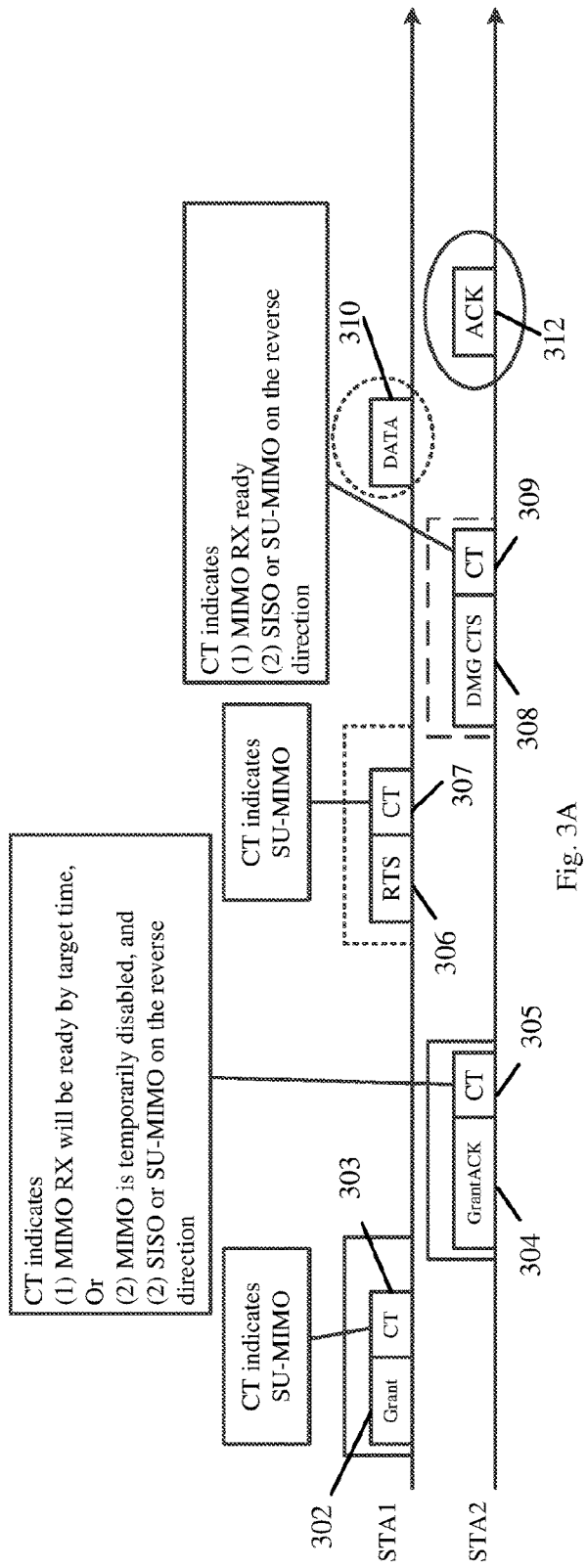
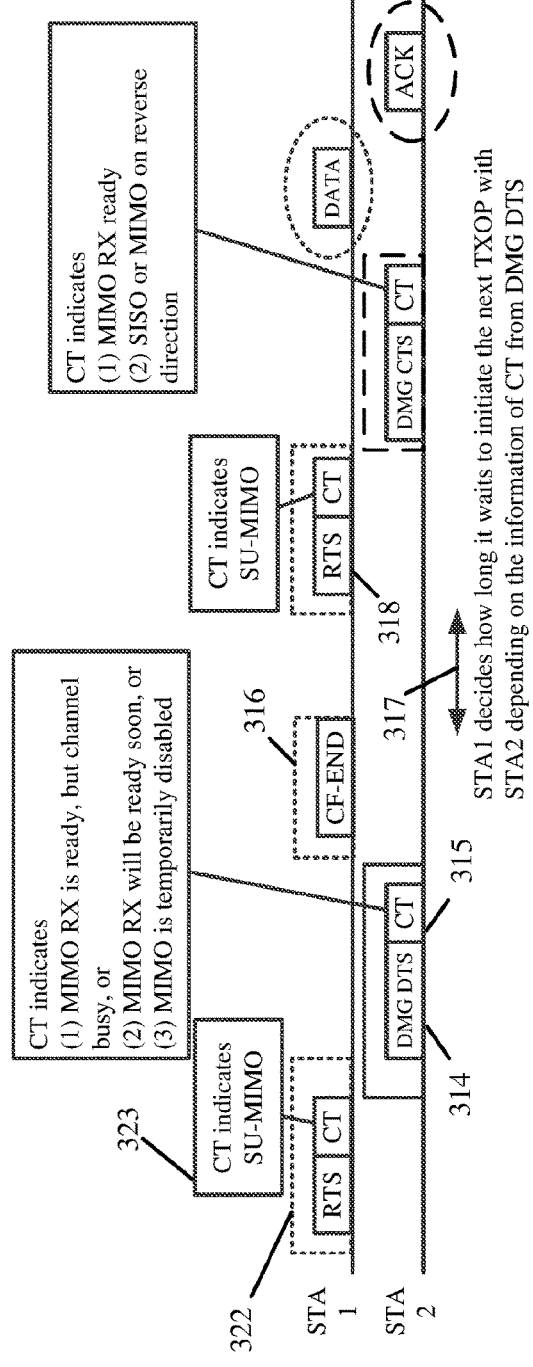
Fig. 3A
Fig. 3B

APPARATUS, SYSTEM AND METHOD OF COMMUNICATING A SINGLE-USER (SU) MULTIPLE-INPUT-MULTIPLE-OUTPUT (MIMO) TRANSMISSION

CROSS REFERENCE

This Application is a Continuation of U.S. patent application Ser. No. 18/079,593 entitled "APPARATUS, SYSTEM AND METHOD OF COMMUNICATING A SINGLE-USER (SU) MULTIPLE-INPUT-MULTIPLE-OUTPUT (MIMO) TRANSMISSION", filed Dec. 12, 2022, which is a Continuation of U.S. patent application Ser. No. 17/030,948 entitled "APPARATUS, SYSTEM AND METHOD OF COMMUNICATING A SINGLE-USER (SU) MULTIPLE-INPUT-MULTIPLE-OUTPUT (MIMO) TRANSMISSION", filed Sep. 24, 2020, and issued as U.S. Pat. No. 11,552,680 on Jan. 10, 2023, which is a Continuation of U.S. patent application Ser. No. 16/487,959 entitled "APPARATUS, SYSTEM AND METHOD OF COMMUNICATING A SINGLE-USER (SU) MULTIPLE-INPUT-MULTIPLE-OUTPUT (MIMO) TRANSMISSION", filed Aug. 22, 2019, and issued as U.S. Pat. No. 11,165,470 on Nov. 2, 2021, which was filed as a National Phase Application of International Application PCT/US2017/039850, filed Jun. 29, 2017, which in turn claims the benefit of and priority from U.S. Provisional Patent Application No. 62/464,672 entitled "APPARATUS, SYSTEM AND METHOD OF COMMUNICATING A SU-MIMO TRANSMISSION", filed Feb. 28, 2017, the entire disclosure of which is incorporated herein by reference.

TECHNICAL FIELD

Embodiments described herein generally relate to communicating a Single-User (SU) Multiple-Input-Multiple-Output (MIMO) transmission.

BACKGROUND

A wireless communication network in a millimeter-wave band may provide high-speed data access for users of wireless communication devices.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 3A is a schematic illustration of communicating a Single User (SU) Multiple-Input-Multiple-Output (MIMO) transmission between first and second stations, in accordance with some demonstrative embodiments.

FIG. 3B is a schematic illustration of communicating SU MIMO transmission between first and second stations, in accordance with some demonstrative embodiments.

DETAILED DESCRIPTION

Figure 1:
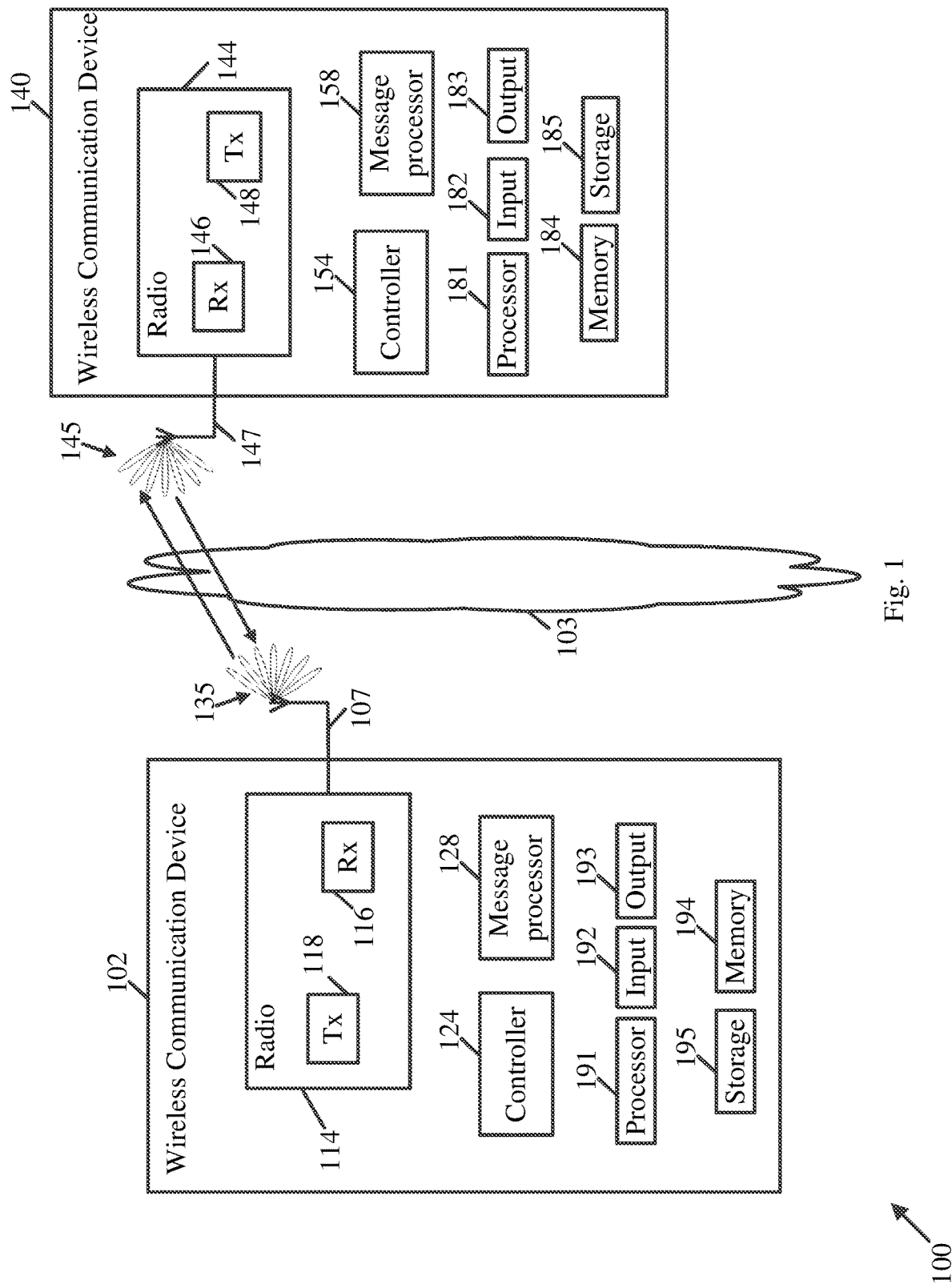
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including IEEE 802.11-2016 (*IEEE 802.11-2016, IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016*); and/or IEEE 802.11ay (*P802.11ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHZ*)) and/or future versions and/or derivatives thereof, devices and/or networks operating in accordance with existing WiFi Alliance (WFA) Peer-to-Peer (P2P) specifications (including *WiFi P2P technical specification*, version 1.5, Aug. 4, 2015) and/or future versions and/or derivatives thereof, devices and/or networks operating in accordance with existing Wireless-Gigabit-Alliance (WGA) specifications (including *Wireless Gigabit Alliance, Inc WiGig MAC and PHY Specification Version* 1.1, April 2011, Final specification) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band above 45 Gigahertz (GHz), e.g., 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHz, a frequency band above 45 GHz, a frequency band below 20 GHz, e.g., a Sub 1 GHz (SIG) band, a 2.4 GHz band, a 5 GHz band, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrases "directional multi-gigabit (DMG)" and "directional band" (DBand), as used herein, may relate to a frequency band wherein the Channel starting frequency is above 45 GHz. In one example, DMG communications may involve one or more directional links to communicate at a rate of multiple gigabits per second, for example, at least 1 Gigabit per second, e.g., at least 7 Gigabit per second, at least 30 Gigabit per second, or any other rate.

Some demonstrative embodiments may be implemented by a DMG STA (also referred to as a "mmWave STA (mSTA)"), which may include for example, a STA having a radio transmitter, which is capable of operating on a channel that is within the DMG band.

The DMG STA may perform other additional or alternative functionality. Other embodiments may be implemented by any other apparatus, device and/or station.

Reference is made to FIG. 1, which schematically illustrates a system 100, in accordance with some demonstrative embodiments.

As shown in FIG. 1, in some demonstrative embodiments, system 100 may include one or more wireless communication devices. For example, system 100 may include a wireless communication device 102, a wireless communication device 140, and/or one more other devices.

In some demonstrative embodiments, devices 102 and/or 140 may include a mobile device or a non-mobile, e.g., a static, device.

For example, devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 may execute instructions, for example, of an Operating System (OS) of device 102 and/or of one or more suitable applications. Processor 181 may execute instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 may include, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102 and/or 140 may be capable of communicating content, data, information and/or signals via a wireless medium (WM) 103. In some demonstrative embodiments, wireless medium 103 may include, for example, a radio channel, a cellular channel, an RF channel, a WiFi channel, an IR channel, a Bluetooth (BT) channel, a Global Navigation Satellite System (GNSS) Channel, and the like.

In some demonstrative embodiments, WM 103 may include one or more directional bands and/or channels. For example, WM 103 may include one or more millimeter-wave (mmWave) wireless communication bands and/or channels.

In some demonstrative embodiments, WM 103 may include one or more DMG channels. In other embodiments WM 103 may include any other directional channels.

In other embodiments, WM 103 may include any other type of channel over any other frequency band.

In some demonstrative embodiments, device 102 and/or device 140 may include one or more radios including circuitry and/or logic to perform wireless communication between devices 102, 140 and/or one or more other wireless communication devices. For example, device 102 may include at least one radio 114, and/or device 140 may include at least one radio 144.

In some demonstrative embodiments, radio 114 and/or radio 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radio 114 and/or radio 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radio 114 and/or radio 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 and/or radio 144 may include or may be implemented as part of a wireless Network Interface Card (NIC), and the like.

In some demonstrative embodiments, radios 114 and/or 144 may be configured to communicate over a directional band, for example, an mmWave band, and/or any other band, for example, a 2.4 GHz band, a 5 GHz band, a SIG band, and/or any other band.

In some demonstrative embodiments, radios 114 and/or 144 may include, or may be associated with one or more, e.g., a plurality of, directional antennas.

In some demonstrative embodiments, device 102 may include one or more, e.g., a plurality of, directional antennas 107, and/or device 140 may include on or more, e.g., a plurality of, directional antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, antennas 107 and/or 147 may include directional antennas, which may be steered to one or more beam directions. For example, antennas 107 may be steered to one or more beam directions 135, and/or antennas 147 may be steered to one or more beam directions 145.

In some demonstrative embodiments, antennas 107 and/or 147 may include and/or may be implemented as part of a single Phased Antenna Array (PAA).

In some demonstrative embodiments, antennas 107 and/or 147 may be implemented as part of a plurality of PAAs, for example, as a plurality of physically independent PAAs.

In some demonstrative embodiments, a PAA may include, for example, a rectangular geometry, e.g., including an integer number, denoted M, of rows, and an integer number, denoted N, of columns. In other embodiments, any other types of antennas and/or antenna arrays may be used.

In some demonstrative embodiments, antennas 107 and/or antennas 147 may be connected to, and/or associated with, one or more Radio Frequency (RF) chains.

In some demonstrative embodiments, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140 and/or one or more other devices, e.g., as described below.

In some demonstrative embodiments, controllers 124 and/or 154 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In some demonstrative embodiments, message processors 128 and/or 158 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, BB circuitry and/or logic, a BB processor, a BB memory, AP circuitry and/or logic, an AP processor, an AP memory, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a System on Chip (SoC). In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of device 140.

In some demonstrative embodiments, device 102 and/or device 140 may include, operate as, perform the role of, and/or perform one or more functionalities of, one or more STAs. For example, device 102 may include at least one STA, and/or device 140 may include at least one STA.

In some demonstrative embodiments, device 102 and/or device 140 may include, operate as, perform the role of, and/or perform one or more functionalities of, one or more DMG STAs. For example, device 102 may include, operate as, perform the role of, and/or perform one or more functionalities of, at least one DMG STA, and/or device 140 may include, operate as, perform the role of, and/or perform one or more functionalities of, at least one DMG STA.

In other embodiments, devices 102 and/or 140 may include, operate as, perform the role of, and/or perform one or more functionalities of, any other wireless device and/or station, e.g., a WLAN STA, a WiFi STA, and the like.

In some demonstrative embodiments, device 102 and/or device 140 may be configured operate as, perform the role of, and/or perform one or more functionalities of, an access point (AP), e.g., a DMG AP, and/or a personal basic service set (PBSS) control point (PCP), e.g., a DMG PCP, for example, an AP/PCP STA, e.g., a DMG AP/PCP STA.

In some demonstrative embodiments, device 102 and/or device 140 may be configured to operate as, perform the role of, and/or perform one or more functionalities of, a non-AP STA, e.g., a DMG non-AP STA, and/or a non-PCP STA, e.g., a DMG non-PCP STA, for example, a non-AP/PCP STA, e.g., a DMG non-AP/PCP STA.

In other embodiments, device 102 and/or device 140 may operate as, perform the role of, and/or perform one or more functionalities of, any other additional or alternative device and/or station.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a personal basic service set (PBSS) control point (PCP) may include an entity that contains a STA, e.g., one station (STA), and coordinates access to the wireless medium (WM) by STAs that are members of a PBSS. The PCP may perform any other additional or alternative functionality.

In one example, a PBSS may include a directional multi-gigabit (DMG) basic service set (BSS) that includes, for example, one PBSS control point (PCP). For example, access to a distribution system (DS) may not be present, but, for example, an intra-PBSS forwarding service may optionally be present.

In one example, a PCP/AP STA may include a station (STA) that is at least one of a PCP or an AP. The PCP/AP STA may perform any other additional or alternative functionality.

In one example, a non-AP STA may include a STA that is not contained within an AP. The non-AP STA may perform any other additional or alternative functionality.

In one example, a non-PCP STA may include a STA that is not a PCP. The non-PCP STA may perform any other additional or alternative functionality.

In one example, a non PCP/AP STA may include a STA that is not a PCP and that is not an AP. The non-PCP/AP STA may perform any other additional or alternative functionality.

In some demonstrative embodiments devices 102 and/or 140 may be configured to communicate over a Next Generation 60 GHz (NG60) network, an Enhanced DMG (EDMG) network, and/or any other network. For example, devices 102 and/or 140 may perform Multiple-Input-Multiple-Output (MIMO) communication, for example, for communicating over the NG60 and/or EDMG networks, e.g., over an NG60 or an EDMG frequency band.

In some demonstrative embodiments, devices 102 and/or 140 may be configured to operate in accordance with one or more Specifications, for example, including one or more IEEE 802.11 Specifications, e.g., an IEEE 802.11-2016 Specification, an IEEE 802.11ay Specification, and/or any other specification and/or protocol.

Some demonstrative embodiments may be implemented, for example, as part of a new standard in an mmWave band, e.g., a 60 GHz frequency band or any other directional band, for example, as an evolution of an IEEE 802.11-2016 Specification and/or an IEEE 802.11ad Specification.

In some demonstrative embodiments, devices 102 and/or 140 may be configured according to one or more standards, for example, in accordance with an IEEE 802.11ay Standard, which may be, for example, configured to enhance the efficiency and/or performance of an IEEE 802.11ad Specification, which may be configured to provide Wi-Fi connectivity in a 60 GHz band.

Some demonstrative embodiments may enable, for example, to significantly increase the data transmission rates defined in the IEEE 802.11ad Specification, for example, from 7 Gigabit per second (Gbps), e.g., up to 30 Gbps, or to any other data rate, which may, for example, satisfy growing demand in network capacity for new coming applications.

Some demonstrative embodiments may be implemented, for example, to allow increasing a transmission data rate, for example, by applying MIMO and/or channel bonding techniques.

In some demonstrative embodiments, devices 102 and/or 140 may be configured to communicate MIMO communications over the mmWave wireless communication band.

In some demonstrative embodiments, device 102 and/or device 140 may be configured to support one or more mechanisms and/or features, for example, channel bonding, Single User (SU) MIMO, and/or Multi-User (MU) MIMO, for example, in accordance with an IEEE 802.11ay Standard and/or any other standard and/or protocol.

In some demonstrative embodiments, device 102 and/or device 140 may include, operate as, perform a role of, and/or perform the functionality of, one or more EDMG STAs. For example, device 102 may include, operate as, perform a role of, and/or perform the functionality of, at least one EDMG STA, and/or device 140 may include, operate as, perform a role of, and/or perform the functionality of, at least one EDMG STA.

In some demonstrative embodiments, devices 102 and/or 140 may implement a communication scheme, which may include Physical layer (PHY) and/or Media Access Control (MAC) layer schemes, for example, to support one or more applications, and/or increased transmission data rates, e.g., data rates of up to 30 Gbps, or any other data rate.

In some demonstrative embodiments, the PHY and/or MAC layer schemes may be configured to support frequency channel bonding over a mmWave band, e.g., over a 60 GHz band, SU MIMO techniques, and/or MU MIMO techniques.

In some demonstrative embodiments, devices 102 and/or 140 may be configured to implement one or more mechanisms, which may be configured to enable SU and/or MU communication of Downlink (DL) and/or Uplink frames (UL) using a MIMO scheme.

In some demonstrative embodiments, device 102 and/or device 140 may be configured to implement one or more MU communication mechanisms. For example, devices 102 and/or 140 may be configured to implement one or more MU mechanisms, which may be configured to enable MU communication of DL frames using a MIMO scheme, for example, between a device, e.g., device 102, and a plurality of devices, e.g., including device 140 and/or one or more other devices.

In some demonstrative embodiments, devices 102 and/or 140 may be configured to communicate over an NG60 network, an EDMG network, and/or any other network and/or any other frequency band. For example, devices 102 and/or 140 may be configured to communicate DL MIMO transmissions and/or UL MIMO transmissions, for example, for communicating over the NG60 and/or EDMG networks.

Some wireless communication Specifications, for example, the IEEE 802.11ad-2012 Specification, may be configured to support a SU system, in which a STA may transmit frames to a single STA at a time. Such Specifications may not be able, for example, to support a STA transmitting to multiple STAs simultaneously, for example, using a MU-MIMO scheme, e.g., a DL MU-MIMO, or any other MU scheme.

In some demonstrative embodiments, devices 102 and/or 140 may be configured to communicate over a channel bandwidth, e.g., of at least 2.16 GHz, in a frequency band above 45 GHz.

In some demonstrative embodiments, devices 102 and/or 140 may be configured to implement one or more mechanisms, which may, for example, enable to extend a single-channel BW scheme, e.g., a scheme in accordance with the IEEE 802.11ad Specification or any other scheme, for higher data rates and/or increased capabilities, e.g., as described below.

In one example, the single-channel BW scheme may include communication over a 2.16 GHz channel (also referred to as a "single-channel" or a "DMG channel").

In some demonstrative embodiments, devices 102 and/or 140 may be configured to implement one or more channel bonding mechanisms, which may, for example, support communication over a channel BW (also referred to as a "wide channel", an "EDMG channel", or a "bonded channel") including two or more channels, e.g., two or more 2.16 GHz channels, e.g., as described below.

In some demonstrative embodiments, the channel bonding mechanisms may include, for example, a mechanism and/or an operation whereby two or more channels, e.g., 2.16 GHz channels, can be combined, e.g., for a higher bandwidth of packet transmission, for example, to enable achieving higher data rates, e.g., when compared to transmissions over a single channel. Some demonstrative embodiments are described herein with respect to communication over a channel BW including two or more 2.16 GHz channels, however other embodiments may be implemented with respect to communications over a channel bandwidth, e.g., a "wide" channel, including or formed by any other number of two or more channels, for example, an aggregated channel including an aggregation of two or more channels.

In some demonstrative embodiments, device 102 and/or device 140 may be configured to implement one or more channel bonding mechanisms, which may, for example, support an increased channel bandwidth, for example, a channel BW of 4.32 GHz, a channel BW of 6.48 GHZ, a channel BW of 8.64 GHZ, and/or any other additional or alternative channel BW, e.g., as described below.

In some demonstrative embodiments, wireless communication devices 102 and/or 140 may form, or may communicate as part of, a wireless local area network (WLAN).

In some demonstrative embodiments, wireless communication devices 102 and/or 140 may form, or may communicate as part of, a WiFi network.

In some demonstrative embodiments, wireless communication devices 102 and/or 140 may form, or may communicate as part of, an EDMG network.

In some demonstrative embodiments, wireless communication devices 102 and/or 140 may include an EDMG STA.

In other embodiments, wireless communication devices 102 and/or 140 may form, and/or communicate as part of, any other additional or alternative network.

In some demonstrative embodiments, devices 102 and/or 140 may be configured to generate, process, transmit and/or receive a Physical Layer Convergence Protocol (PLCP) Protocol Data Unit (PPDU) having a PPDU format (also referred to as "EDMG PPDU format"), which may be configured, for example, for communication between EDMG stations, e.g., as described below.

In some demonstrative embodiments, a PPDU, e.g., an EMDG PPDU, may include at least one non-EDMG field, e.g., a legacy field, which may be identified, decodable, and/or processed by one or more devices ("non-EDMG devices", or "legacy devices"), which may not support one or more features and/or mechanisms ("non-legacy" mechanisms or "EDMG mechanisms"). For example, the legacy devices may include non-EDMG stations, which May be, for example, configured according to an IEEE 802.11-2016 Standard, and the like. For example, a non-EDMG station may include a DMG station, which is not an EDMG station.

In some demonstrative embodiments, the EDMG PPDU may be configured to include a Control Trailer (CT), e.g., as described below.

In some demonstrative embodiments, devices 102 and/or 140 may be configured to generate, transmit, receive, and/or process one or more PPDUs, for example, control mode PPDUs, including a control trailer, which may be configured, for example, to provide control signaling and/or any other control information, e.g., as described below.

Figure 2:
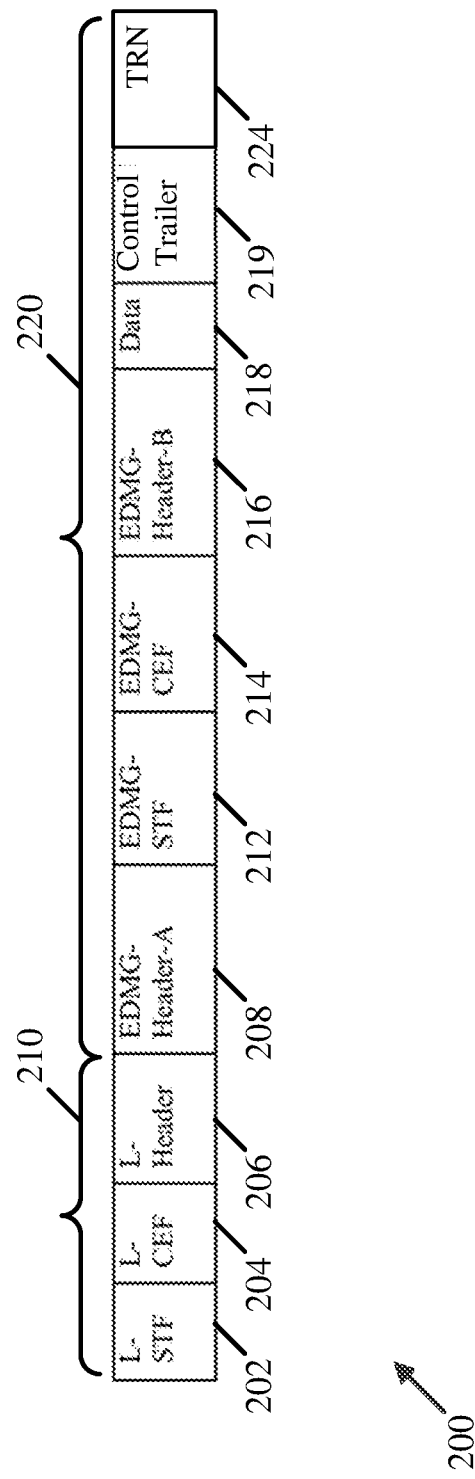
FIG. 2 is a schematic illustration of an Enhanced Directional Multi-Gigabit (EDMG) Physical Layer Protocol Data Unit (PPDU) format, which may be implemented in accordance with some demonstrative embodiments.

Reference is made to FIG. 2, which schematically illustrates an EDMG PPDU format 200, which may be implemented in accordance with some demonstrative embodiments. In one example, devices 102 (FIG. 1) and/or 140 (FIG. 1) may be configured to generate, transmit, receive and/or process one or more EDMG PPDUs having the structure and/or format of EDMG PPDU 200.

In one example, devices 102 (FIG. 1) and/or 140 (FIG. 1) may communicate PPDU 200, for example, as part of a transmission over a channel, e.g., an EDMG channel, having a channel bandwidth including one or more 2.16 GHz channels, for example, including a channel BW of 2.16 GHz, a channel BW of 4.32 GHz, a channel BW of 6.478 GHz, a channel BW of 8.64 GHz, and/or any other channel BW, e.g., as described below.

In some demonstrative embodiments, as shown in FIG. 2, EDMG PPDU 200 may include a non-EDMG portion 210 ("legacy portion"), e.g., as described below.

In some demonstrative embodiments, as shown in FIG. 2, non-EDMG portion 210 may include a non-EDMG (legacy) Short Training Field (STF) (L-STF) 202, a non-EDMG (Legacy) Channel Estimation Field (CEF) (L-CEF) 204, and/or a non-EDMG header (L-header) 206.

In some demonstrative embodiments, as shown in FIG. 2, EDMG PPDU 200, may include an EDMG portion 220, for example, following non-EDMG portion 210, e.g., as described below.

In some demonstrative embodiments, as shown in FIG. 2, EDMG portion 220 may include a first EDMG header, e.g., an EDMG-Header-A 208, an EDMG-STF 212, an EDMG-CEF 214, a second EDMG header, e.g., an EDMG-Header-B 216, a Data field 218, and/or one or more beamforming training fields, e.g., a TRN field 224.

In some demonstrative embodiments, EDMG portion 220 may include, for example a control trailer 219, e.g., following data field 218. In one example, control trailer 219 may be included instead of TRN field 224. In another example, control trailer 219 may be included before TRN field 224.

In some demonstrative embodiments, control trailer 219 may be included in one or more types of DMG or non-EDMG PPDUs, for example, a grant frame, a grant ACK frame, an RTS, a CTS, a DTS, or the like, e.g., as described below.

In some demonstrative embodiments, EDMG portion 220 may include some or all of the fields shown in FIG. 2 and/or one or more other additional or alternative fields.

Referring back to FIG. 1, in some demonstrative embodiments, devices 102 and/or 140 may be configured to support SU-MIMO communications, e.g., as described below.

In some demonstrative embodiments, devices 102 and/or 140 may be configured to perform one or more operations of a SU-MIMO communication flow. For example, devices 102 and/or 140 may be configured to perform one or more setup operations, channel access operations, one or more operations of a Transmit Opportunity (TXOP) establishment, one or more operations of a data transaction, and/or one or more additional operations and/or procedures, e.g., as described below.

In some demonstrative embodiments, devices 102 and/or 140 may be configured to support one or more MIMO channel access rules, including, for example, how to perform physical carrier sensing, virtual carrier sensing, and/or a backoff procedure, which may be configured to support, for example, a flow, e.g., a partial or complete flow, for SU-MIMO, e.g., as described below.

In some demonstrative embodiments, devices 102 and/or 140 may be configured to perform a downlink communication, for example, in a downlink direction from a TXOP owner to a TXOP responder, e.g., as described below.

In some demonstrative embodiments, devices 102 and/or 140 may be configured to perform an uplink communication, for example, in an uplink direction (also referred to as a "reverse direction") form the TXOP responder to the TXOP owner, e.g., a described below.

In one example, a first station, e.g., a station implemented by device 102, may operate as, perform the role of, and/or perform one or more functionalities of, a TXOP owner; and/or a second station, e.g., a station implemented by device 140, may operate as, perform the role of, and/or perform one or more functionalities of, the TXOP responder. In other embodiments, devices 102 and/or 140 may operate as, perform the role of, and/or perform one or more functionalities of, any additional or alternative station and/or device.

In some demonstrative embodiments, devices 102 and/or 140 may perform one or more operations and/or communications, for example, to enable SU-MIMO communication between devices 102 and 140, e.g., as described below.

In some demonstrative embodiments, devices 102 and/or 140 may be configured to generate, transmit, receive, process and/or use a Grant message with a control trailer, and/or grant acknowledgement (GrantACK) with a control trailer, e.g., according to the EDMG PPDU format of FIG. 2 and/or any other PPDU format, for example, to set up a MIMO channel access time, for example, as well as a Single-Input-Single-Output (SISO) or SU-MIMO transmission, for example, on one or more directions of communication, for example, each direction of the uplink direction and the downlink direction, e.g., as described below.

In some demonstrative embodiments, devices 102 and/or 140 may be configured to generate, transmit, receive, process and/or use one or more PPDUs, e.g., EDMG PPDUs and/or non-EDMG PPDUs, e.g., as described above with respect to FIG. 2, for example, to set and/or cancel a Network Allocation Vector (NAV), and/or to signal a MIMO configuration and/or status between devices 102 and 140, e.g., as described below.

In some demonstrative embodiments, devices 102 and/or 140 may be configured to generate, transmit, receive, process and/or use a Request to Send (RTS) with a control trailer, a DMG (or non-EDMG) Clear to Send (CTS) with a control trailer, a DMG (or non-EDMG) Denial to Send (DTS) with a control trailer, and/or a Contention Free (CF) end (CF-END), for example, to set and/or cancel a NAV, and/or to signal a MIMO configuration and/or status between devices 102 and 140, e.g., as described below.

In some demonstrative embodiments, devices 102 and/or 140 may be configured to perform one or more, e.g., some or all, of the operations described below.

In some demonstrative embodiments, devices 102 and/or 140 may be configured to perform one or more additional or alternative operations, e.g., to perform a SU-MIMO transmission.

In some demonstrative embodiments, devices 102 and/or 140 may be configured to follow one or more rules, for example, when communicating one or more of the RTS, the CTS, the DTS, and/or the CF-END, e.g., as described below.

In some demonstrative embodiments, for example, when a SU-MIMO mode is to be used in a downlink direction, an RTS with a control trailer may be transmitted, e.g., should be transmitted, using all MIMO TX sectors of the TXOP owner, for example, to protect all the TX directions at the TXOP owner, e.g., as described below.

In some demonstrative embodiments, for example, when a SISO mode is to be used in an uplink direction, a DMG CTS with a control trailer may be transmitted, e.g., should be transmitted, using SISO, and an Acknowledge (ACK) or block acknowledge (BACK) and Reverse Direction (RD) DATA may be transmitted, e.g., should be transmitted, using SISO, e.g., as described below.

In some demonstrative embodiments, for example, when SU-MIMO mode is used in the uplink direction, a DMG CTS with a control trailer may be transmitted, e.g., should be transmitted, for example, using all MIMO TX sectors of the TXOP owner, and/or an ACK/BACK and/or RD DATA may be transmitted using SU-MIMO, e.g., as described below.

In some demonstrative embodiments, there may be at least two options, which may be implemented, for example, to guarantee that a TXOP owner is ready for SU-MIMO reception from a Tx responder, for example, if the TXOP responder wants to use SU-MIMO for uplink transmission to the TXOP owner, e.g., as described below.

In some demonstrative embodiments, one or more rules and/or procedures to support initiating, performing, and/or communicating an SU-MIMO transmission may be based, for example, on one or more assumption, e.g., as described below.

In some demonstrative embodiments, a MIMO-capable EDMG STA, e.g., devices 102 and/or 140, may not always have all the necessary antennas "on" and/or may not be ready for a MIMO communication. For example, a MIMO-capable EDMG STA may be configured to turn on one or more antennas, e.g., extra or additional antennas, for MIMO communication, for example, when the EDMG STA decides to be an MIMO initiator, or when the EDMG STA is notified to be a MIMO responder. In one example, it may take some time to turn an antenna from an off state to an on state, and/or to configure the antenna.

In some demonstrative embodiments, a TXOP owner may decide to transmit to a TXOP responder using a SU-MIMO scheme, and/or the TXOP responder may decide to transmit to the TXOP owner using a SU-MIMO scheme or a SISO scheme. For example, the downlink communication may include a SU-MIMO communication, while the uplink communication may be performed as a SISO or SU-MIMO communication, e.g., as described below.

In some demonstrative embodiments, devices 102 and/or 140 may be configured to communicate according to a MIMO channel access rule. In one example, the MIMO channel access rule may require that a MIMO-capable EDMG STA shall keep a physical Carrier Sense (CS), a virtual CS, and/or a backoff procedure for SISO, for example, in order to perform a SISO transmission and/or reception, for example, during a MIMO TXOP establishment.

For example, at least a Clear Channel Assessment (CCA) of energy detection shall be maintained, such that, for example, at least all the directions of MIMO TX sectors may be observed. In one example, MIMO channel access may be allowed, for example, only when a TXOP is obtained, for example, based on physical CS, virtual CS, and/or backoff procedure, that may enable a SISO transaction, and/or CCA that cover at least all the MIMO TX sectors may be clear, for example, for a point coordination function (PCF) InterFrame space (PIFS) time that ends immediately, e.g., before the start of the transmission.

In some demonstrative embodiments, devices 102 and/or 140 may utilize one or more, e.g., some or all, of the rules describe above, and/or one or more additional or alternative rules, for example, when initiating, performing, and/or communicating a SU-MIMO transmission.

In some embodiments, devices 102 and/or 140 may be configured to perform some or all of the operations for MIMO channel access and/or may communicate according to any other additional or alternative MIMO channel access rule, and/or criteria.

In some demonstrative embodiments, a SU-MIMO Beamforming (BF) protocol may be configured, for example, to train SU-MIMO beams for both downlink and uplink directions.

In some demonstrative embodiments, for example, only one set of SU-MIMO sectors may be trained and/or maintained for each direction between a pair of STAs. Therefore, according to these embodiments, indicating "using SU-MIMO" for either downlink or uplink may implicitly indicate SU-MIMO configurations for both Transmit (TX) and Receive (RX).

In some demonstrative embodiments, a MIMO-capable EDMG STA may use different DMG antennas to perform SU-MIMO TX and SU-MIMO RX to the same destination STA. For example, when a MIMO-capable EDMG STA activates its DMG antennas to transmit to another STA using SU-MIMO, it may not be ready to receive from the same STA using SU-MIMO.

In some demonstrative embodiments, devices 102 and/or 140 may be configured to perform one or more operations of a SU-MIMO flow to perform a SU-MIMO communication, e.g., as described below. In some demonstrative embodiments, devices 102 and/or 140 may be configured to perform some or all of the operations of the SU-MIMO flow and/or to perform one or more additional or alternative operations and/or communications.

In some demonstrative embodiments, a TXOP owner, e.g., a station implemented by device 102, may initiate an SU-MIMO transmission to a TXOP responder, e.g., a station implemented by device 140, for example, based on an RTS/CTS exchange, e.g., as described below.

In some demonstrative embodiments, device 102 may transmit an RTS to device 140, and/or device 140 may transmit a CTS to device 102, e.g., in response to the RTS, for example, before transmission of the SU-MIMO transmission, for example, to establish a TXOP to transmit the SU-MIMO transmission, e.g., as described below.

In some demonstrative embodiments, controller 124 may be configured to control, cause, and/or trigger device 102 and/or transmitter 118 to transmit an RTS to device 140 via a plurality of SU-MIMO Tx sectors of device 102.

In some demonstrative embodiments, the RTS may include a DMG RTS frame or a non-EDMG RTS frame, e.g., an RTS decodable by DMG STAs. For example, the DMG RTS frame may include one or more fields of non-EDMG portion 210 (FIG. 2), and one or more fields of EDMG portion 220 (FIG. 2), e.g., at least control trailer 219 (FIG. 2). In other embodiments, the RTS may include any other frame.

In some demonstrative embodiments, the RTS may be configured to establish a TXOP to transmit a SU-MIMO transmission to device 140.

In some demonstrative embodiments, a control trailer of the RTS, e.g., control trailer 219 (FIG. 2), may include an indication of an intent to transmit the SU-MIMO transmission to device 140.

In some demonstrative embodiments, device 140 may receive the RTS from device 102, e.g., as described below.

In some demonstrative embodiments, controller 154 may be configured to control, cause, and/or trigger device 140 and/or receiver 146 to receive from device 102 the RTS, including the control trailer including the indication of the intent to transmit the SU-MIMO transmission to device 140, e.g., from device 102.

In some demonstrative embodiments, controller 154 may be configured to control, cause, and/or trigger device 140 and/or transmitter 148 to transmit a CTS to device 102, for example, when device 140 is ready to receive the SU-MIMO transmission, e.g., from device 102.

In some demonstrative embodiments, the CTS may include a DMG CTS frame or a non-EDMG CTS frame, e.g., a CTS decodable by DMG STAs. For example, the DMG CTS frame may include one or more fields of non-EDMG portion 210 (FIG. 2), and one or more fields of EDMG portion 220 (FIG. 2), e.g., at least control trailer 219 (FIG. 2). In other embodiments, the CTS may include any other frame.

In one example, device 140 and/or transmitter 148 may transmit the CTS, e.g., in response to the RTS from device 102.

In some demonstrative embodiments, a control trailer of the CTS, e.g., control trailer 219 (FIG. 2), may include a mode indication to indicate whether device 140 is to use a SISO mode or a SU-MIMO mode, for example, to transmit a reverse direction transmission, e.g., an uplink transmission, to device 102, e.g., as described below.

In some demonstrative embodiments, controller 154 may be configured to control, cause, and/or trigger device 140 and/or transmitter 148 to transmit the CTS via a plurality of SU-MIMO Tx sectors of device 140, for example, when the mode indication in the control trailer of the CTS is to indicate the SU-MIMO mode.

In some demonstrative embodiments, controller 154 may be configured to control, cause, and/or trigger device 140 and/or transmitter 148 to transmit the CTS as a SISO transmission, for example, when the mode indication in the control trailer of the CTS is to indicate the SISO mode.

In some demonstrative embodiments, device 102 may receive the CTS from device 140, for example, in response to the RTS from device 102, e.g., as described below.

In some demonstrative embodiments, controller 124 may be configured to control, cause, and/or trigger device 102 and/or receiver 116 to receive from device 140 the CTS indicating that device 140 is ready to receive the SU-MIMO transmission. For example, the control trailer of the CTS may include the mode indication to indicate whether device 140 is to use the SISO mode or the SU-MIMO mode to transmit the reverse direction transmission to device 102.

In some demonstrative embodiments, controller 124 may be configured to control, cause, and/or trigger device 102 and/or transmitter 118 to transmit the SU-MIMO transmission to device 140, for example, upon receipt of the CTS from device 140 indicating that device 140 is ready to receive the SU-MIMO transmission.

In some demonstrative embodiments, the SU-MIMO transmission may include an EDMG SU-MIMO transmission.

In some demonstrative embodiments, controller 124 may be configured to control, cause, and/or trigger device 102 and/or transmitter 118 to transmit the SU-MIMO transmission over a frequency band above 45 GHz.

In other embodiments, the SU-MIMO transmission may include any other SU-MIMO transmission.

In some demonstrative embodiments, device 140 may receive the SU-MIMO transmission from device 102, e.g., as described below.

In some demonstrative embodiments, controller 154 may be configured to control, cause, and/or trigger device 140 and/or receiver 146 to receive the SU-MIMO transmission from device 102.

In some demonstrative embodiments, controller 154 may be configured to control, cause, and/or trigger device 140 and/or receiver 146 to receive the SU-MIMO transmission over the frequency band above 45 GHz.

In some demonstrative embodiments, device 140 may transmit to device 102 an acknowledgment of the SU-MIMO transmission, for example, to acknowledge receipt of the SU-MIMO transmission from device 102, e.g., as described below.

In some demonstrative embodiments, controller 154 may be configured to control, cause, and/or trigger device 140 and/or transmitter 148 to transmit the acknowledgment of the SU-MIMO transmission, for example, according to the mode indication in the control trailer of the CTS, e.g., as described below.

In some demonstrative embodiments, controller 154 may be configured to control, cause, and/or trigger device 140 and/or transmitter 148 to transmit the acknowledgment of the SU-MIMO transmission via the plurality of SU-MIMO Tx sectors of device 140, for example, when the mode indication in the control trailer of the CTS is to indicate the SU-MIMO mode.

In some demonstrative embodiments, controller 154 may be configured to control, cause, and/or trigger device 140 and/or transmitter 148 to transmit the acknowledgment of the SU-MIMO transmission as a SISO transmission, for example, when the mode indication in the control trailer of the CTS is to indicate the SISO mode.

In some demonstrative embodiments, device 102 may receive the acknowledgment from device 102, e.g., as described below.

In some demonstrative embodiments, controller 124 may be configured to control, cause, and/or trigger device 102 and/or receiver 116 to receive from device 140 the acknowledgment of the SU-MIMO transmission, for example, according to the mode indication in the control trailer of the CTS from device 140, e.g., as described below.

In some demonstrative embodiments, controller 124 may be configured to control, cause, and/or trigger device 102 and/or receiver 116 to receive the acknowledgment from device 140 via a plurality of SU-MIMO Rx sectors of device 102, for example, when the mode indication in the control trailer of the CTS indicates a SU-MIMO mode.

In some demonstrative embodiments, controller 124 may be configured to control, cause, and/or trigger device 102 and/or receiver 116 to receive the acknowledgment from device 140 as a SISO transmission, for example, when the mode indication in the control trailer of the CTS indicates a SISO mode.

In some demonstrative embodiments, device 140 may transmit a reverse direction transmission to device 102, e.g., after receipt of the SU-MIMO transmission from device 102, or after transmission of the acknowledgment of the SU-MIMO transmission from device 102, e.g., as described below.

In some demonstrative embodiments, controller 154 may be configured to control, cause, and/or trigger device 140 and/or transmitter 148 to transmit to device 102 a reverse direction transmission according to the mode indication in the control trailer of the CTS, e.g., as described below.

In some demonstrative embodiments, controller 154 may be configured to control, cause, and/or trigger device 140 and/or transmitter 148 to transmit the reverse direction transmission to device 102 via the plurality of SU-MIMO Tx sectors of device 140, for example, when the mode indication in the control trailer of the CTS is to indicate the SU-MIMO mode.

In some demonstrative embodiments, controller 154 may be configured to control, cause, and/or trigger device 140 and/or transmitter 148 to transmit the reverse direction transmission to device 102 as a SISO transmission, for example, when the mode indication in the control trailer of the CTS is to indicate the SISO mode.

In some demonstrative embodiments, device 102 may receive the reverse direction transmission from device 140, e.g., as described below.

In some demonstrative embodiments, controller 124 may be configured to control, cause, and/or trigger device 102 and/or receiver 116 to receive the reverse direction transmission from device 140, for example, according to the mode indication in the control trailer of the CTS from device 140, e.g., as described below.

In some demonstrative embodiments, controller 124 may be configured to control, cause, and/or trigger device 102 and/or receiver 116 to receive the reverse direction transmission from device 140 via a plurality of SU-MIMO Rx sectors of device 102, for example, when the mode indication in the control trailer of the CTS indicates a SU-MIMO mode.

In some demonstrative embodiments, controller 124 may be configured to control, cause, and/or trigger device 102 and/or receiver 116 to receive the reverse direction transmission from device 140 as a SISO transmission, for example, when the mode indication in the control trailer of the CTS indicates a SISO mode.

In some demonstrative embodiments, device 102 may be configured to indicate whether device 102 is able to receive the reverse direction transmission from device 140 in SU-MIMO mode, e.g., as described below.

In one example, devices 102 and/or 140 may be configured to implement one or more rules, which may be configured, for example, to guarantee that a TXOP owner, e.g., device 102, is ready for an SU-MIMO RX, for example, when the TXOP responder, e.g., device 140, indicates in the CTS with control trailer that a SU-MIMO mode is to be used for an uplink (reverse direction) transmission from the TxOP responder, e.g., as described below.

In some demonstrative embodiments, devices 102 and/or 140 may be configured to implement at least one of the options described below, and/or any other additional or alternative rule to guarantee that the TXOP owner is ready for SU-MIMO RX.

In some demonstrative embodiments, according to one option ("Option1"), for example, if the TXOP owner would like to transmit a SU-MIMO to the TXOP responder, the TXOP owner shall also be ready to receive a SU-MIMO from the TXOP responder. In this way, when the TXOP responder indicates the intention to perform SU-MIMO in uplink, the TXOP owner should always be ready for the SU-MIMO in the reverse direction.

In some demonstrative embodiments, according to another option ("Option2"), for example, the TXOP owner may not active all the DMG antennas for SU-MIMO reception with the TXOP responder, but may include information of its activated DMG antennas in the control trailer of the RTS. For example, it may be the responsibility of the TXOP responder to identify, for example, if the TXOP owner is available for SU-MIMO reception, e.g., if the TXOP owner has all the DMG antennas on in order to receive SU-MIMO from TXOP responder. For example, if the TXOP owner is available, then the TXOP responder may indicate SU-MIMO for uplink in the control trailer of DMG CTS. Otherwise, the TXOP responder may indicate SISO for uplink in the control trailer of DMG CTS.

In some demonstrative embodiments, devices 102 and/or 140 may be configured to implement one or more operations according to the first option, e.g., as describe below.

In some demonstrative embodiments, controller 124 may be configured to control, cause, and/or trigger device 102 to be ready to receive a reverse direction SU-MIMO transmission from device 140, based on indicating the intent of device 102 to transmit the SU-MIMO transmission to device 140, e.g., in the RTS frame.

In some demonstrative embodiments, controller 154 may be configured to allow device 140 and/or transmitter 148 to transmit a reverse direction SU-MIMO transmission to device 102, for example, when the RTS includes the indication of the intent to transmit the SU-MIMO transmission to device 140.

In some demonstrative embodiments, devices 102 and/or 140 may be configured to implement one or more operations according to the second option, e.g., as describe below.

In some demonstrative embodiments, controller 124 may be configured to control, cause, and/or trigger device 102 to include in the control trailer of the RTS to device 140, an indication on whether device 102 is to be ready to receive a reverse direction SU-MIMO transmission from device 140.

In some demonstrative embodiments, device 140 may be configured to transmit the reverse direction transmission, for example, based on the indication from device 102, e.g., as described below.

In some demonstrative embodiments, controller 154 may be configured to allow device 140 and/or transmitter 148 to transmit a reverse direction SU-MIMO transmission to device 102, for example, when the RTS from device 102 includes the indication of the intent to transmit the SU-MIMO transmission to device 140, or when the control trailer of the RTS from device 102 to device 140 includes an indication that device 102 is ready to receive a reverse direction SU-MIMO transmission from device 140.

In some demonstrative embodiments, devices 102 and/or 140 may not be able to establish a TXOP to transmit the SU-MIMO from device 102 to device 140, e.g., as described below.

In some demonstrative embodiments, device 102 may transmit to device 140 the RTS to device 140 including the indication of the intent to transmit the SU-MIMO transmission to device 140.

In some demonstrative embodiments, device 140 may receive the RTS and may not be able to establish the TXOP with device 102, for example, for any reason.

In some demonstrative embodiments, controller 154 may be configured to control, cause, and/or trigger device 140 and/or transmitter 148 to transmit a DTS to device 102 to indicate failure of establishment of a TXOP for communicating the SU-MIMO transmission.

In some demonstrative embodiments, a control trailer of the DTS, e.g., control trailer 219 (FIG. 2), may indicate a reason for the failure.

In some demonstrative embodiments, device 102 may receive the DTS frame from device 140.

In some demonstrative embodiments, controller 124 may be configured to control, cause, and/or trigger device 102 and/or receiver 116 to receive the DTS from device 140 indicating the failure of establishment of the TXOP, and including the control trailer to indicate the reason for the failure.

In some demonstrative embodiments, controller 124 may be configured to control, cause, and/or trigger device 102 and/or transmitter 118 to transmit to device 140 a Contention-Free End (CF-END) frame via the plurality of SU-MIMO Tx sectors of device 102.

In some demonstrative embodiments, the CF-END frame may be configured to indicate an end of the TxOP.

In one example, the CF-END frame may be transmitted to device 140 in response to the DTS from device 140, e.g., to indicate the end of the TxOP.

In another example, the CF-END frame may be transmitted to device 140 to indicate an end of a TxOP, e.g., an end initiated by device 102, and/or not as a response to a DTS frame from device 140.

In some demonstrative embodiments, device 140 may receive the CF-END frame from device 102, for example, to end the TXOP, e.g., as described below.

In some demonstrative embodiments, controller 154 may be configured to control, cause, and/or trigger device 140 and/or receiver 146 to receive from device 102 the CF-END frame from device 102 indicating an end of the TXOP for communicating the SU-MIMO transmission.

In some demonstrative embodiments, devices 102 and 140 may exchange a grant and a grant ACK frames, for example, prior to the exchange of the RTS and CTS, for example, to set a time for the TXOP, e.g., as described below.

In some demonstrative embodiments, controller 124 may be configured to control, cause, and/or trigger device 102 and/or transmitter 118 to transmit a grant frame to device 140.

In some demonstrative embodiments, the grant frame may include an indication of a time for the TXOP, e.g., as described below.

In some demonstrative embodiments, a control trailer of the grant frame, e.g., control trailer 219 (FIG. 2), may include the indication of the intent to transmit the SU-MIMO transmission to device 140.

In some demonstrative embodiments, device 140 may receive the grant frame from device 102, e.g., as described below.

In some demonstrative embodiments, controller 154 may be configured to control, cause, and/or trigger device 140 and/or receiver 146 to receive from device 102 the grant frame including the indication of the time for the TXOP and the control trailer including the indication of the intent to transmit the SU-MIMO transmission to device 140.

In some demonstrative embodiments, controller 154 may be configured to control, cause, and/or trigger device 140 and/or transmitter 148 to transmit a grant acknowledge (ACK) to device 102.

In some demonstrative embodiments, the grant ACK may be configured to acknowledge reception of the grant frame from device 102, e.g., as described below.

In some demonstrative embodiments, a control trailer of the grant ACK, e.g., control trailer 219 (FIG. 2), may indicate whether device 140 is ready to receive the SU-MIMO transmission from device 102.

In some demonstrative embodiments, the control trailer of the grant ACK may include a mode indication to indicate whether device 140 is to use a SISO mode or a SU-MIMO mode to transmit a reverse direction transmission to device 102, for example, similar to the control trailer of the CTS from device 140, e.g., as described above.

In some demonstrative embodiments, device 102 may receive the grant ACK from device 140, e.g., as described below.

In some demonstrative embodiments, controller 124 may be configured to control, cause, and/or trigger device 102 and/or receiver 116 to receive the grant ACK from device 140 to acknowledge reception of the grant frame, a control trailer of the grant ACK to indicate whether device 140 is ready to receive the SU-MIMO transmission.

In some demonstrative embodiments, devices 102 and 140 may exchange the RTS and CTS, e.g., after the exchange of the grant and grant ACK frames to indicate the time of the TXOP.

Reference is made to FIG. 3A, which schematically illustrates communicating a SU MIMO transmission between a first STA, denoted STA1, and a second STA, denoted STA2, according to a first communication flow, and to FIG. 3B, which schematically illustrates communicating a SU MIMO transmission between the first and second stations according to a second communication flow, in accordance with some demonstrative embodiments.

In one example, the STA1 be configured to operate as, perform a role of, and/or perform one or more functionalities of, a TxOP owner, and/or device the STA2 may be configured to operate as, perform a role of, and/or perform one or more functionalities of a TxOP responder.

In one example, device 102 may be configured to operate as, perform a role of, and/or perform one or more functionalities of, the STA1, and/or device 140 may be configured to operate as, perform a role of, and/or perform one or more functionalities of the STA2.

In some demonstrative embodiments, as shown in FIG. 3A, the communication flow may include an optional exchange of a Grant frame 302 and a Grant ACK frame 304.

In some demonstrative embodiments, as shown in FIG. 3A, for example, the Grant frame 302 and/or the Grant ACK frame 304, e.g., both the Grant and the Grant ACK, may include a control trailer appended, e.g., control trailer 219 (FIG. 2). For example, grant frame 302 may include a control trailer 303, and/or grant Ack frame 304 may include a control trailer 305.

In some demonstrative embodiments, the exchange of the Grant 302 and GrantACK 304 may be used, for example, at least to set up a time to start a MIMO channel access attempt, indicate a SU-MIMO intention from a Grant initiator, e.g., STA1, to a Grant responder, e.g., STA2, and/or to indicate a SISO or SU-MIMO intention for reverse direction communication from the Grant responder to the Grant initiator, e.g., as descried below.

In some demonstrative embodiments, for example, when the STA1 may decide to transmit SU-MIMO data to STA2, the STA1 may send Grant frame 302 with control trailer 303 to the STA2, e.g., using a SISO mode.

In some demonstrative embodiments, as shown in FIG. 3A, the Grant frame 302 with control trailer 303 may include, for example, information including at least an indication of a target time when the STA1 will attempt to access a channel in order to obtain a TXOP to communicate to STA2, and/or the Control trailer 303 of the Grant frame 302 may indicate that the STA1 would like to transmit to STA2 using SU-MIMO.

In one example, there may be no confusion on what antenna configuration STA1 and STA2 should use for the SU-MIMO transmission and/or reception, for example, since there may be only one set of SU-MIMO TX and/or RX beams from STA1 to STA2 that are trained and/or maintained, e.g., based on a previous beamforming procedure.

In some demonstrative embodiments, as shown in FIG. 3A, the STA2 may receive the Grant frame 302 from STA1, and may reply with GrantACK frame 304 with the control trailer 305, e.g., in a SISO mode.

In some demonstrative embodiments, as shown in FIG. 3A, the GrantACK 304 may include, for example, information including the acknowledgement of the reception of Grant frame 302 from STA1. For example, the control trailer 305 may indicate whether or not the STA 2 may be able to support the SU MIMO transmission and/or whether or not the STA2 is to use a SU-MIMO mode for transmission to STA1.

In one example, as shown in FIG. 3A, the control trailer 305 of the GrantACK frame 304 may include one or more indications, e.g., as described below.

In one example, as shown in FIG. 3A, control trailer 305 may indicate whether SU-MIMO RX may be ready at the target time indicated in the Grant frame 302 from STA1.

In another example, as shown in FIG. 3A, control trailer 305 may indicate whether MIMO of STA 2 is temporarily disabled, e.g., if device is running on battery or battery low, or for any other reason.

In another example, as shown in FIG. 3A, control trailer 305 may indicate whether SISO mode or SU-MIMO mode will be used from STA2 to STA1.

In some demonstrative embodiments, the STA2 may initiate another exchange of Grant and GrantACK frames between STA2 and STA1, for example, after STA1 completes the exchange of the Grant frame 302 and GrantACK frame 304 with STA2.

In some demonstrative embodiments, as shown in FIG. 3A, for example, after the exchange of the Grant frame 302 and GrantACK frame 304, at some point, e.g., at or after the target time if Grant is used, the STA1 may start to perform a MIMO channel access, e.g., in order to communicate with the STA2 using SU-MIMO.

In some demonstrative embodiments, as shown in FIG. 3A, for example, when the STA1 obtains a TXOP and has CCA for all the MIMO TX sectors clear for PIFS, the STA1 may send to the STA2 a RTS 306 with a control trailer 307, for example, using all the SU-MIMO TX sectors of STA 1, e.g., with a small delay introduced in between each sector to avoid unintentional beamforming.

In one example, in this way, the RTS 306 may be sent through all the SU-MIMO TX sectors of STA1, for example, to enable 3rd party STAs on these directions, which may receive the RTS 306, to set their NAV.

In some demonstrative embodiments, as shown in FIG. 3A, the control trailer 307 of the RTS 306 may include, for example, part or all of the following information, and/or other additional or alternative information.

In some demonstrative embodiments, as shown in FIG. 3A, the control trailer 307 may indicate that the STA1 would like to transmit to STA2 using SU-MIMO. For example, there may be no confusion on what antenna configuration STA1 and STA2 should use for the SU-MIMO transmission and/or reception, e.g., since there may be only one set of SU-MIMO TX and/or RX beams from STA1 to STA2 that may be trained and/or maintained.

In some demonstrative embodiments, as shown in FIG. 3A, for example, the STA2 may receive the RTS 306 with the control trailer 307 from STA1.

In some demonstrative embodiments, as shown in FIG. 3A, the STA2 may reply with a DMG CTS 308 with a control trailer 309, e.g., to indicate if the STA2 is ready for SU-MIMO reception from the STA1, e.g., as described below.

In some demonstrative embodiments, the STA2 may optionally reply with a DMG DTS with a control trailer, for example, if the STA2 is not ready for SU-MIMO reception from the STA1, e.g., as described below with reference to FIG. 3B.

In some demonstrative embodiments, as shown in FIG. 3A, for example, if the STA2 is ready for SU-MIMO reception from the STA1, the STA2 may send back DMG CTS 308 with control trailer 309, e.g., as described below.

In some demonstrative embodiments, as shown in FIG. 2, control trailer 309 may include, for example, part or all of the following information, and/or other additional or alternative information In one example, as shown in FIG. 3A, control trailer 309 may indicate whether an uplink channel from STA2 to STA1 is available.

In another example, as shown in FIG. 3A, control trailer 309 may indicate whether SU-MIMO RX of STA 2 is ready.

In another example, control trailer 309 may indicate whether SISO or SU-MIMO will be used for a reverse direction transmission from STA2 to STA1.

In some demonstrative embodiments, for example, if STA 2 is to use SISO for uplink transmission, the DMG CTS 308 with the control trailer 309 may be transmitted using the SISO mode.

In some demonstrative embodiments, for example, if STA 2 is to use SU-MIMO for uplink transmission, the DMG CTS 308 with the control trailer 309 may be transmitted, for example, using all the MIMO TX sectors of STA 2, e.g., with delay introduced in between each sector to avoid unintentional beamforming.

In some demonstrative embodiments, as shown in FIG. 3A, when the STA1 receives the DMG CTS 308 from STA2, the STA1 may transmit a SU-MIMO data transmission 310 to the STA2.

In some demonstrative embodiments, as shown in FIG. 3A, the STA2 may acknowledge receipt of data transmission 310 to the STA1, for example, by sending a ACK/BACK 312 with Reverse Direction (RD) data, e.g., if RD is granted, for example, in the SISO mode, e.g., if SISO is used for uplink; or in the SU-MIMO mode, e.g., if SU-MIMO is used for uplink.

In some demonstrative embodiments, STA 2 may not be ready for SU-MIMO reception from the STA1, e.g., as described below.

In some demonstrative embodiments, as shown in FIG. 3B, for example, if the STA2 is not ready for SU-MIMO reception from the STA1 after receiving an RTS 322 with a control trailer 323 from STA1, the STA2 may optionally send back a DMG DTS 314 with a control trailer 315, e.g., using the SISO mode.

In some demonstrative embodiments, the DMG DTS 315 with control trailer 315 may include, for example, part or all of the following information, and/or other additional or alternative information.

In some demonstrative embodiments, DMG DTS 314 may indicate that TXOP establishment is failed.

In some demonstrative embodiments, as shown in FIG. 3B, control trailer 315 may indicate a reason of the TXOP establishment failure.

In some demonstrative embodiments, as shown in FIG. 3B, possible reasons for the TXOP establishment failure may include, for example, but not limited to an SU-MIMO reception of STA2 is not ready yet, MIMO of STA2 is temporarily disabled, an Uplink channel from STA2 to STA 1 is busy, and/or any other reason.

In other embodiments, control trailer 315 may indicate any other reason of a TXOP establishment failure.

In some demonstrative embodiments, as shown in FIG. 3B, for example, if the STA1 receives the DMG DTS 314 with control trailer 315, or if the STA1 decides to truncate the TXOP, the STA1 may cancel the NAVs that are set on other STAs, for example, by sending a CF-END frame 316, e.g., using the same mode the STA1 transmitted RTS 306 with control trailer 307.

In one example, if the RTS 206 is sent using all the MIMO TX sectors of STA1 with delay introduced in between each sector to avoid unintentional beamforming, the CF-END 316 may also be transmitted using all the MIMO TX sectors of STA1 with delay introduced in between each sector to avoid unintentional beamforming.

In another example, if the RTS 206 is sent using the SISO mode, the CF-END 316 may be transmitted using the SISO mode.

In some demonstrative embodiments, as shown in FIG. 3B, for example, the STA1 may initiate another RTS 318 with control trailer 319 to the STA2, e.g., after a time period 317, for example, based on the reason given in control trailer 315 of DMG DTS 314.

Referring back to FIG. 1, in some demonstrative embodiments, devices 102 and/or 140 may be configured to operate as, perform a role of, and/or perform one or more functionalities of an EDMG STA, which may be configured to perform one or more operations to communicate a SU-MIMO transmission according to one or more rules, e.g., as described below.

In some demonstrative embodiments, an EDMG STA shall transmit a Grant frame with a control trailer to a peer EDMG STA to indicate the intent to transmit a MIMO PPDU to the peer STA if the Grant Required field within the peer STA's EDMG Capabilities element is one. Otherwise if the Grant Required field within the peer STA's EDMG Capabilities is zero, the STA may transmit a Grant frame.

In some demonstrative embodiments, in the transmitted Grant frame, a value of an Allocation Duration field plus a Duration field of the Grant frame indicates the time offset from the PHY-TXEND.indication primitive of the Grant frame transmission when the EDMG STA intends to initiate access to the channel to transmit to the peer EDMG STA. For the transmitted Grant frame, a TXVECTOR parameter CONTROL_TRAILER shall be set to Present and a parameter CT-TYPE shall be set to Grant. A SISO/MIMO field shall be set to 1 and an SU/MU MIMO field shall be set to 0 to indicate that the following transmission is performed in SU-MIMO. The control trailer also indicates the corresponding antenna configuration for the upcoming SU-MIMO transmission.

In some demonstrative embodiments, if an EDMG STA that receives a Grant frame with a control trailer indicating a SU-MIMO transmission to itself is able to perform the SU-MIMO receiving at the target time indicated by the Grant frame, it shall configure its antennas according to the settings included in the control trailer of the received Grant frame within a time period of the Allocation Duration field plus the Duration field of the received Grant frame after the PHY-TXEND.indication primitive of the Grant frame transmission. It shall also transmit a Grant Ack frame in response of the received Grant frame. For this transmitted Grant Ack frame, the TXVECTOR parameter CONTROL_TRAILER shall be set to Present and the parameter CT-TYPE shall be set to Grant. If it uses SU-MIMO for the transmission of the reverse direction, the SISO/MIMO field shall be set to 1 and the SU/MU MIMO field shall be set to 0. The control trailer also indicates the corresponding antenna configuration for the upcoming SU-MIMO transmission in the reverse direction. If it uses SISO for the transmission of the reverse direction, the SISO/MIMO field shall be set to 0.

In some demonstrative embodiments, an EDMG STA shall transmit an RTS frame with a control trailer to a peer EDMG STA to access the channel and establish a SU-MIMO TXOP. This RTS frame should be transmitted using all SU-MIMO sectors, with a small delay between each sector. For the transmitted RTS frame, the TXVECTOR parameter CONTROL_TRAILER shall be set to Present and the parameter CT-TYPE shall be set to RTS. The SISO/MIMO field shall be set to 1 and the SU/MU MIMO field shall be set to 0 to indicate that the following transmission is performed in SU-MIMO. The control trailer also indicates the corresponding antenna configuration for the upcoming SU-MIMO transmission.

In some demonstrative embodiments, if an EDMG STA that receives an RTS frame with a control trailer indicating a SU-MIMO transmission to itself is able to perform the SU-MIMO receiving, it shall configure its antennas according to the settings included in the control trailer of the received RTS frame. It shall also transmit a CTS frame with a control trailer in response of the received RTS frame. For this transmitted CTS frame, the TXVECTOR parameter CONTROL_TRAILER shall be set to Present and the parameter CT-TYPE shall be set to CTS. If it uses SU-MIMO for the transmission of the reverse direction, the SISO/MIMO field shall be set to 1 and the SU/MU MIMO field shall be set to 0. The CTS frame should be transmitted using all SU-MIMO sectors, with a small delay between each sector. The control trailer also indicates the corresponding antenna configuration for the upcoming SU-MIMO transmission in the reverse direction. If it uses SISO for the transmission of the reverse direction, the SISO/MIMO field shall be set to 0. The CTS frame should be sent using the SISO sector. Alternatively, if the EDMG STA is not able to perform the SU-MIMO transmission, it may transmit a DTS frame with a control trailer to the TXOP initiator to provide further information. The DTS frame should be sent using the SISO sector.

In some demonstrative embodiments, all the RTS/CTS procedures shall follow MIMO channel access rules to establish a SU-MIMO TXOP.

In some demonstrative embodiments, the EDMG STA that initiates the SU-MIMO TXOP may send a CF-END to cancel the NAV on SU-MIMO channels and release unused TXOP. The CF-END should be sent using all SU-MIMO sectors, with a small delay between each sector.

Figure 4:
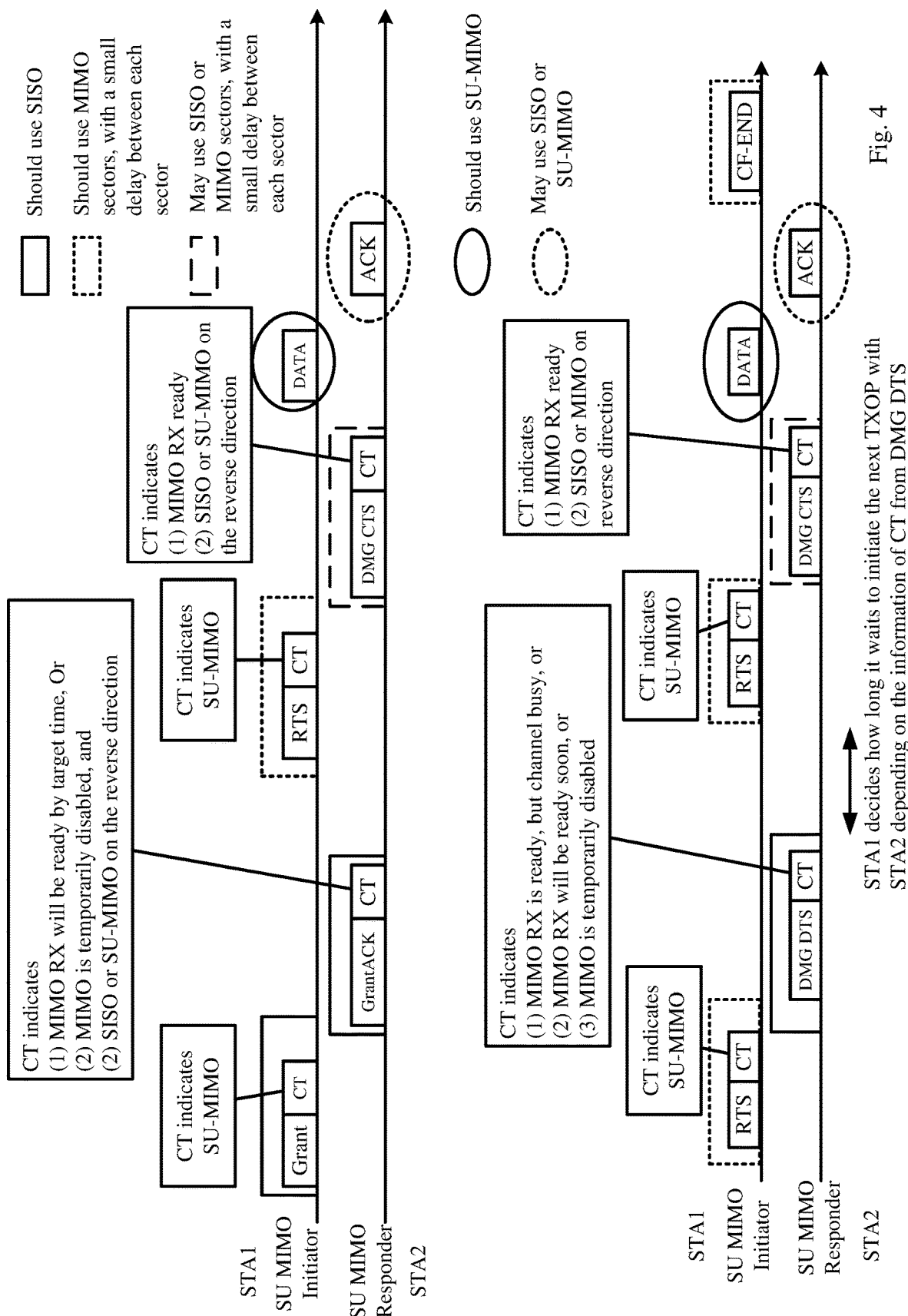
FIG. 4 is a schematic illustration of communicating SU MIMO transmission between first and second stations, in accordance with some demonstrative embodiments.

FIG. 4 is a schematic illustration of communicating SU MIMO transmission between first and second stations, in accordance with some demonstrative embodiments. For example, one or more of the communications of FIG. 4 may be performed by a first EDMG STA, e.g., device 102 (FIG. 1), and a second EDMG STA, e.g., device 140 (FIG. 1), for example, according to one or more of the rules described above.

Figure 5:
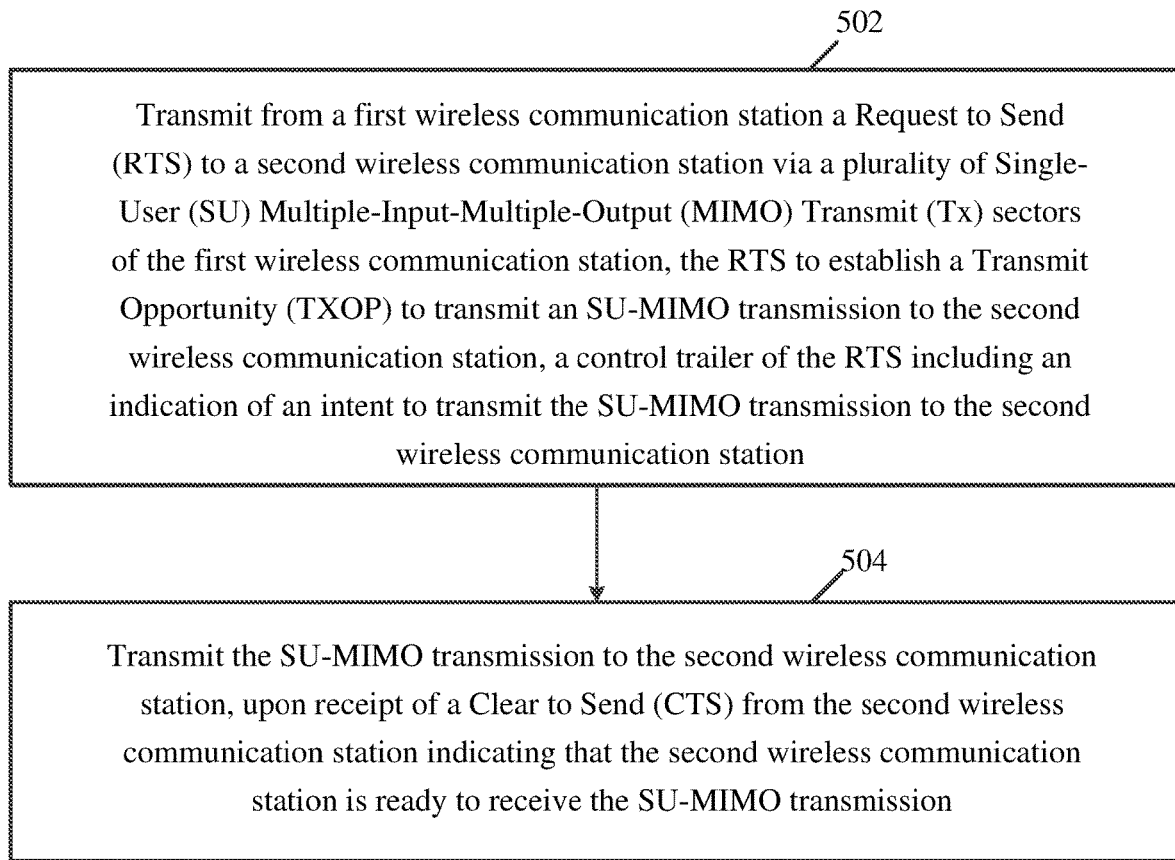
FIG. 5 is a schematic flow-chart illustration of a method of transmitting a SU MIMO transmission, in accordance with some demonstrative embodiments.

Reference is made to FIG. 5, which schematically illustrates a method of transmitting a SU-MIMO transmission, in accordance with some demonstrative embodiments. For example, one or more of the operations of the method of FIG. 5 may be performed by one or more elements of a system, e.g., system 100 (FIG. 1), for example, one or more wireless devices, e.g., device 102 (FIG. 1), and/or device 140 (FIG. 1); a controller, e.g., controller 124 (FIG. 1), and/or controller 154 (FIG. 1); a radio, e.g., radio 114 (FIG. 1), and/or radio 144 (FIG. 1); a transmitter, e.g., transmitter 118 (FIG. 1), and/or transmitter 148 (FIG. 1); a receiver, e.g., receiver 116 (FIG. 1), and/or receiver 146 (FIG. 1); and/or a message processor, e.g., message processor 128 (FIG. 1), and/or message processor 158 (FIG. 1).

As indicated at block 502, the method may include transmitting an RTS from a first wireless communication station to a second wireless communication station via a plurality of SU-MIMO Tx sectors of the first wireless communication station, the RTS to establish a TXOP to transmit an SU-MIMO transmission to the second wireless communication station, a control trailer of the RTS including an indication of an intent to transmit the SU-MIMO transmission to the second wireless communication station. For example, controller 102 (FIG. 1) may control, cause, and/or trigger device 102 (FIG. 1) to transmit the RTS to device 140 (FIG. 1) via the plurality of SU-MIMO Tx sectors of device 102, the RTS to establish the TXOP to transmit the SU-MIMO transmission to device 140; and including a control trailer including the indication of the intent to transmit the SU-MIMO transmission to device 140 (FIG. 1), e.g., as described above.

As indicated at block 504, the method may include transmitting the SU-MIMO transmission to the second wireless communication station, for example, upon receipt of a CTS from the second wireless communication station indicating that the second wireless communication station is ready to receive the SU-MIMO transmission. For example, controller 124 (FIG. 1) may control, cause, and/or trigger device 102 (FIG. 1) to transmit the SU-MIMO transmission to device 140 (FIG. 1), for example, upon receipt of the CTS from device 140 (FIG. 1) indicating that device 140 (FIG. 1) is ready to receive the SU-MIMO transmission from device 102 (FIG. 1), e.g., as described above.

Figure 6:
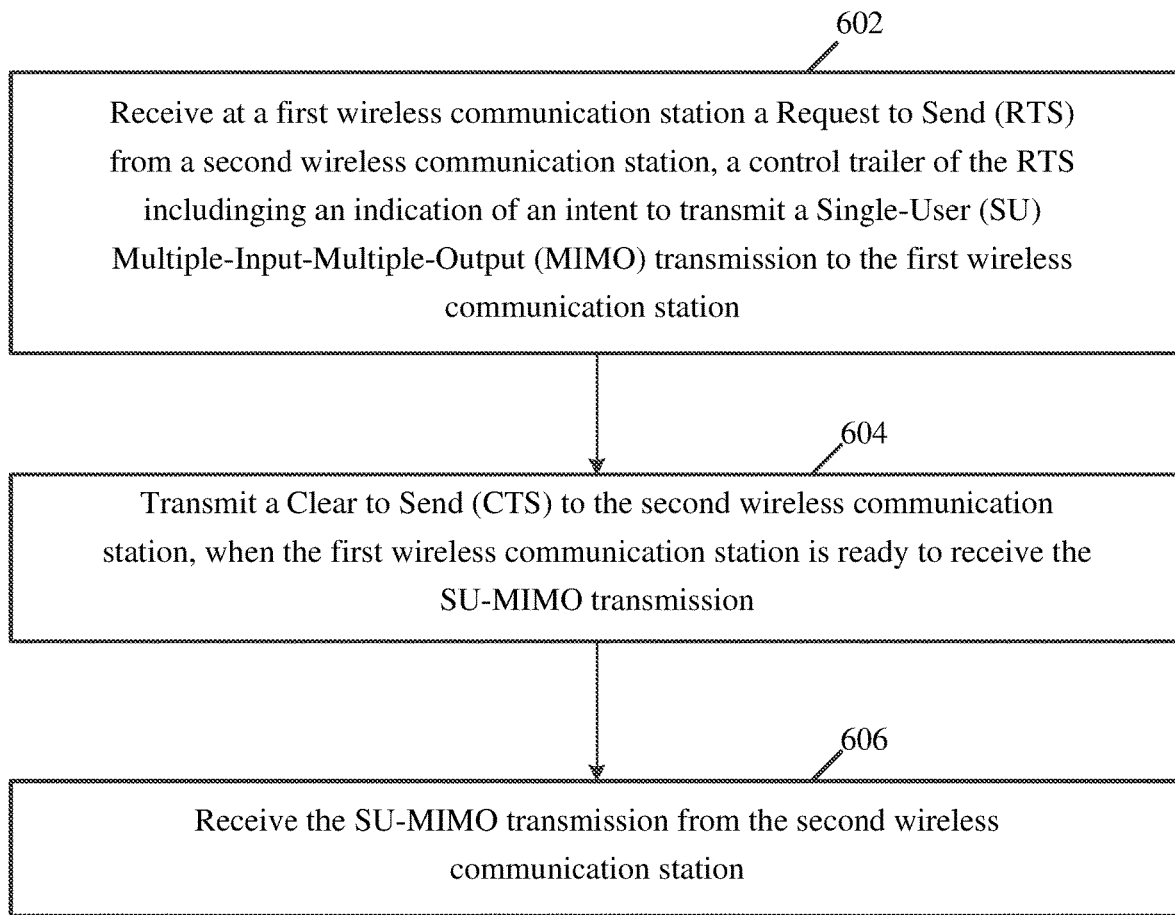
FIG. 6 is a schematic flow-chart illustration of a method of receiving a SU-MIMO transmission, in accordance with some demonstrative embodiments.

Reference is made to FIG. 6, which schematically illustrates a method of receiving a SU-MIMO transmission, in accordance with some demonstrative embodiments. For example, one or more of the operations of the method of FIG. 6 may be performed by one or more elements of a system, e.g., system 100 (FIG. 1), for example, one or more wireless devices, e.g., device 102 (FIG. 1), and/or device 140 (FIG. 1); a controller, e.g., controller 124 (FIG. 1), and/or controller 154 (FIG. 1); a radio, e.g., radio 114 (FIG. 1), and/or radio 144 (FIG. 1); a transmitter, e.g., transmitter 118 (FIG. 1), and/or transmitter 148 (FIG. 1); a receiver, e.g., receiver 116 (FIG. 1), and/or receiver 146 (FIG. 1); and/or a message processor, e.g., message processor 128 (FIG. 1), and/or message processor 158 (FIG. 1).

As indicated at block 602, the method may include receiving at a first wireless communication station an RTS from a second wireless communication station, a control trailer of the RTS including an indication of an intent to transmit a SU-MIMO transmission to the first wireless communication station. For example, controller 154 (FIG. 1) may control, cause, and/or trigger device 140 (FIG. 1) to receive from device 140 (FIG. 1) the RTS including the control trailer including the indication of the intent to transmit the SU-MIMO transmission to device 140 (FIG. 1), e.g., as described above.

As indicated at block 604, the method may include transmitting a CTS to the second wireless communication station, when the first wireless communication station is ready to receive the SU-MIMO transmission. For example, controller 154 (FIG. 1) may control, cause and/or trigger device 140 (FIG. 1) to transmit to device 102 (FIG. 1) the CTS, for example, when device 140 (FIG. 1) is ready to receive the SU-MIMO transmission from device 102 (FIG. 1), e.g., as described above.

As indicated at block 606, the method may include receiving the SU-MIMO transmission from the second wireless communication station. For example, controller 154 (FIG. 1) may control, cause and/or trigger device 140 (FIG. 1) to receive the SU-MIMO transmission from device 102 (FIG. 1), e.g., as described above.

Figure 7:
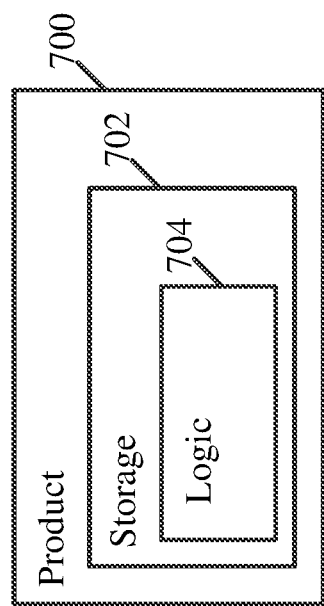
FIG. 7 is a schematic illustration of a product of manufacture, in accordance with some demonstrative embodiments.

Reference is made to FIG. 7, which schematically illustrates a product of manufacture 700, in accordance with some demonstrative embodiments. Product 700 may include one or more tangible computer-readable non-transitory storage media 702, which may include computer-executable instructions, e.g., implemented by logic 704, operable to, when executed by at least one processor, e.g., computer processor, enable the at least one processor to implement one or more operations at device 102 (FIG. 1), device 140 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), controller 124 (FIG. 1), controller 154 (FIG. 1), message processor 128 (FIG. 1), and/or message processor 158 (FIG. 1), to cause device 102 (FIG. 1), device 140 (FIG. 1), radio 114 (FIG. 1), radio 144 (FIG. 1), transmitter 118 (FIG. 1), transmitter 148 (FIG. 1), receiver 116 (FIG. 1), 1), receiver 146 (FIG. 1), controller 124 (FIG. 1), controller 154 (FIG. 1), message processor 128 (FIG. 1), and/or message processor 158 (FIG. 1) to perform one or more operations, and/or to perform, trigger and/or implement one or more operations, communications and/or functionalities described above with reference to FIGS. 1, 2, 3, 4, 5 and/or 6, and/or one or more operations described herein. The phrase "non-transitory machine-readable medium" is directed to include all computer-readable media, with the sole exception being a transitory propagating signal.

In some demonstrative embodiments, product 700 and/or storage media 702 may include one or more types of computer-readable storage media capable of storing data, including volatile memory, non-volatile memory, removable or non-removable memory, erasable or non-erasable memory, writeable or re-writeable memory, and the like. For example, storage media 702 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 704 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 704 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising logic and circuitry configured to cause a first wireless communication station to transmit a Request to Send (RTS) to a second wireless communication station via a plurality of Single-User (SU) Multiple-Input-Multiple-Output (MIMO) Transmit (Tx) sectors of the first wireless communication station, the RTS to establish a Transmit Opportunity (TXOP) to transmit an SU-MIMO transmission to the second wireless communication station, a control trailer of the RTS comprising an indication of an intent to transmit the SU-MIMO transmission to the second wireless communication station; and transmit the SU-MIMO transmission to the second wireless communication station, upon receipt of a Clear to Send (CTS) from the second wireless communication station indicating that the second wireless communication station is ready to receive the SU-MIMO transmission.

Example 2 includes the subject matter of Example 1, and optionally, wherein a control trailer of the CTS comprises a mode indication to indicate whether the second wireless communication station is to use a Single Input Single Output (SISO) mode or a SU-MIMO mode to transmit a reverse direction transmission to the first wireless communication station.

Example 3 includes the subject matter of Example 2, and optionally, wherein the apparatus is configured to cause the first wireless communication station to receive from the second wireless communication station an acknowledgment of the SU-MIMO transmission according to the mode indication in the control trailer of the CTS.

Example 4 includes the subject matter of Example 3, and optionally, wherein the apparatus is configured to cause the first wireless communication station to receive the acknowledgment from the second wireless communication station via a plurality of SU-MIMO Receive (Rx) sectors of the first wireless communication station, when the mode indication in the control trailer of the CTS indicates a SU-MIMO mode.

Example 5 includes the subject matter of Example 3 or 4, and optionally, wherein the apparatus is configured to cause the first wireless communication station to receive the acknowledgment from the second wireless communication station as a SISO transmission, when the mode indication in the control trailer of the CTS indicates a SISO mode.

Example 6 includes the subject matter of any one of Examples 1-5, and optionally, wherein the apparatus is configured to cause the first wireless communication station receive a Denial to Send (DTS) from the second wireless communication station to indicate failure of establishment of the TXOP, a control trailer of the DTS to indicate a reason for the failure.

Example 7 includes the subject matter of any one of Examples 1-6, and optionally, wherein the apparatus is configured to cause the first wireless communication station to transmit a grant frame to the second wireless communication station, the grant frame comprising an indication of a time for the TXOP, a control trailer of the grant frame comprising the indication of the intent to transmit the SU-MIMO transmission to the second wireless communication station.

Example 8 includes the subject matter of Example 7, and optionally, wherein the apparatus is configured to cause the first wireless communication station to receive a grant acknowledge (ACK) from the second wireless communication station, the grant ACK to acknowledge reception of the grant frame, a control trailer of the grant ACK to indicate whether the second wireless communication station is ready to receive the SU-MIMO transmission.

Example 9 includes the subject matter of Example 8, and optionally, wherein the control trailer of the grant ACK comprises a mode indication to indicate whether the second wireless communication station is to use a Single Input Single Output (SISO) mode or a SU-MIMO mode to transmit a reverse direction transmission to the first wireless communication station.

Example 10 includes the subject matter of any one of Examples 1-9, and optionally, wherein the apparatus is configured to cause the first wireless communication station to be ready to receive a reverse direction SU-MIMO transmission from the second wireless communication station, based on indicating the intent of the first wireless communication station to transmit the SU-MIMO transmission to the second wireless communication station.

Example 11 includes the subject matter of any one of Examples 1-9, and optionally, wherein the apparatus is configured to cause the first wireless communication station to include in the control trailer of the RTS an indication on whether the first wireless communication station is to be ready to receive a reverse direction SU-MIMO transmission from the second wireless communication station.

Example 12 includes the subject matter of any one of Examples 1-11, and optionally, wherein the apparatus is configured to cause the first wireless communication station to transmit a Contention-Free End (CF-END) frame via the plurality of SU-MIMO Tx sectors of the first wireless communication station, the CF-END frame to indicate an end of the TxOP.

Example 13 includes the subject matter of any one of Examples 1-12, and optionally, wherein the apparatus is configured to cause the first wireless communication station to transmit the SU-MIMO transmission via the plurality of SU-MIMO Tx sectors of the first wireless communication station.

Example 14 includes the subject matter of any one of Examples 1-13, and optionally, wherein the apparatus is configured to cause the first wireless communication station to transmit the SU-MIMO transmission over a frequency band above 45 Gigahertz (GHz).

Example 15 includes the subject matter of any one of Examples 1-14, and optionally, wherein the RTS comprises a Directional Multi-Gigabit (DMG) RTS frame, the CTS comprises a DMG CTS frame, and the SU-MIMO transmission comprises an Enhanced DMG (EDMG) SU-MIMO transmission.

Example 16 includes the subject matter of any one of Examples 1-15, and optionally, comprising a radio.

Example 17 includes the subject matter of any one of Examples 1-16, and optionally, comprising one or more antennas.

Example 18 includes a system of wireless communication comprising a first wireless communication station, the first wireless communication station comprising one or more antennas; a radio; a memory; a processor; and a controller configured to cause the first wireless communication station to transmit a Request to Send (RTS) to a second wireless communication station via a plurality of Single-User (SU) Multiple-Input-Multiple-Output (MIMO) Transmit (Tx) sectors of the first wireless communication station, the RTS to establish a Transmit Opportunity (TXOP) to transmit an SU-MIMO transmission to the second wireless communication station, a control trailer of the RTS comprising an indication of an intent to transmit the SU-MIMO transmission to the second wireless communication station; and transmit the SU-MIMO transmission to the second wireless communication station, upon receipt of a Clear to Send (CTS) from the second wireless communication station indicating that the second wireless communication station is ready to receive the SU-MIMO transmission.

Example 19 includes the subject matter of Example 18, and optionally, wherein a control trailer of the CTS comprises a mode indication to indicate whether the second wireless communication station is to use a Single Input Single Output (SISO) mode or a SU-MIMO mode to transmit a reverse direction transmission to the first wireless communication station.

Example 20 includes the subject matter of Example 19, and optionally, wherein the controller is configured to cause the first wireless communication station to receive from the second wireless communication station an acknowledgment of the SU-MIMO transmission according to the mode indication in the control trailer of the CTS.

Example 21 includes the subject matter of Example 20, and optionally, wherein the controller is configured to cause the first wireless communication station to receive the acknowledgment from the second wireless communication station via a plurality of SU-MIMO Receive (Rx) sectors of the first wireless communication station, when the mode indication in the control trailer of the CTS indicates a SU-MIMO mode.

Example 22 includes the subject matter of Example 20 or 21, and optionally, wherein the controller is configured to cause the first wireless communication station to receive the acknowledgment from the second wireless communication station as a SISO transmission, when the mode indication in the control trailer of the CTS indicates a SISO mode.

Example 23 includes the subject matter of any one of Examples 18-22, and optionally, wherein the controller is configured to cause the first wireless communication station to receive a Denial to Send (DTS) from the second wireless communication station to indicate failure of establishment of the TXOP, a control trailer of the DTS to indicate a reason for the failure.

Example 24 includes the subject matter of any one of Examples 18-23, and optionally, wherein the controller is configured to cause the first wireless communication station to transmit a grant frame to the second wireless communication station, the grant frame comprising an indication of a time for the TXOP, a control trailer of the grant frame comprising the indication of the intent to transmit the SU-MIMO transmission to the second wireless communication station.

Example 25 includes the subject matter of Example 24, and optionally, wherein the controller is configured to cause the first wireless communication station to receive a grant acknowledge (ACK) from the second wireless communication station, the grant ACK to acknowledge reception of the grant frame, a control trailer of the grant ACK to indicate whether the second wireless communication station is ready to receive the SU-MIMO transmission.

Example 26 includes the subject matter of Example 25, and optionally, wherein the control trailer of the grant ACK comprises a mode indication to indicate whether the second wireless communication station is to use a Single Input Single Output (SISO) mode or a SU-MIMO mode to transmit a reverse direction transmission to the first wireless communication station.

Example 27 includes the subject matter of any one of Examples 18-26, and optionally, wherein the controller is configured to cause the first wireless communication station to be ready to receive a reverse direction SU-MIMO transmission from the second wireless communication station, based on indicating the intent of the first wireless communication station to transmit the SU-MIMO transmission to the second wireless communication station.

Example 28 includes the subject matter of any one of Examples 18-26, and optionally, wherein the controller is configured to cause the first wireless communication station to include in the control trailer of the RTS an indication on whether the first wireless communication station is to be ready to receive a reverse direction SU-MIMO transmission from the second wireless communication station.

Example 29 includes the subject matter of any one of Examples 18-28, and optionally, wherein the controller is configured to cause the first wireless communication station to transmit a Contention-Free End (CF-END) frame via the plurality of SU-MIMO Tx sectors of the first wireless communication station, the CF-END frame to indicate an end of the TxOP.

Example 30 includes the subject matter of any one of Examples 18-29, and optionally, wherein the controller is configured to cause the first wireless communication station to transmit the SU-MIMO transmission via the plurality of SU-MIMO Tx sectors of the first wireless communication station.

Example 31 includes the subject matter of any one of Examples 18-30, and optionally, wherein the controller is configured to cause the first wireless communication station to transmit the SU-MIMO transmission over a frequency band above 45 Gigahertz (GHz).

Example 32 includes the subject matter of any one of Examples 18-31, and optionally, wherein the RTS comprises a Directional Multi-Gigabit (DMG) RTS frame, the CTS comprises a DMG CTS frame, and the SU-MIMO transmission comprises an Enhanced DMG (EDMG) SU-MIMO transmission.

Example 33 includes a method to be performed at a first wireless communication station, the method comprising transmitting a Request to Send (RTS) to a second wireless communication station via a plurality of Single-User (SU) Multiple-Input-Multiple-Output (MIMO) Transmit (Tx) sectors of the first wireless communication station, the RTS to establish a Transmit Opportunity (TXOP) to transmit an SU-MIMO transmission to the second wireless communication station, a control trailer of the RTS comprising an indication of an intent to transmit the SU-MIMO transmission to the second wireless communication station; and transmitting the SU-MIMO transmission to the second wireless communication station, upon receipt of a Clear to Send (CTS) from the second wireless communication station indicating that the second wireless communication station is ready to receive the SU-MIMO transmission.

Example 34 includes the subject matter of Example 33, and optionally, wherein a control trailer of the CTS comprises a mode indication to indicate whether the second wireless communication station is to use a Single Input Single Output (SISO) mode or a SU-MIMO mode to transmit a reverse direction transmission to the first wireless communication station.

Example 35 includes the subject matter of Example 34, and optionally, comprising receiving from the second wireless communication station an acknowledgment of the SU-MIMO transmission according to the mode indication in the control trailer of the CTS.

Example 36 includes the subject matter of Example 35, and optionally, comprising receiving the acknowledgment from the second wireless communication station via a plurality of SU-MIMO Receive (Rx) sectors of the first wireless communication station, when the mode indication in the control trailer of the CTS indicates a SU-MIMO mode.

Example 37 includes the subject matter of Example 35 or 36, and optionally, comprising receiving the acknowledgment from the second wireless communication station as a SISO transmission, when the mode indication in the control trailer of the CTS indicates a SISO mode.

Example 38 includes the subject matter of any one of Examples 33-37, and optionally, comprising receiving a Denial to Send (DTS) from the second wireless communication station to indicate failure of establishment of the TXOP, a control trailer of the DTS to indicate a reason for the failure.

Example 39 includes the subject matter of any one of Examples 33-38, and optionally, comprising transmitting a grant frame to the second wireless communication station, the grant frame comprising an indication of a time for the TXOP, a control trailer of the grant frame comprising the indication of the intent to transmit the SU-MIMO transmission to the second wireless communication station.

Example 40 includes the subject matter of Example 39, and optionally, comprising receiving a grant acknowledge (ACK) from the second wireless communication station, the grant ACK to acknowledge reception of the grant frame, a control trailer of the grant ACK to indicate whether the second wireless communication station is ready to receive the SU-MIMO transmission.

Example 41 includes the subject matter of Example 40, and optionally, wherein the control trailer of the grant ACK comprises a mode indication to indicate whether the second wireless communication station is to use a Single Input Single Output (SISO) mode or a SU-MIMO mode to transmit a reverse direction transmission to the first wireless communication station.

Example 42 includes the subject matter of any one of Examples 33-41, and optionally, comprising being ready to receive a reverse direction SU-MIMO transmission from the second wireless communication station, based on indicating the intent of the first wireless communication station to transmit the SU-MIMO transmission to the second wireless communication station.

Example 43 includes the subject matter of any one of Examples 33-41, and optionally, comprising including in the control trailer of the RTS an indication on whether the first wireless communication station is to be ready to receive a reverse direction SU-MIMO transmission from the second wireless communication station.

Example 44 includes the subject matter of any one of Examples 33-43, and optionally, comprising transmitting a Contention-Free End (CF-END) frame via the plurality of SU-MIMO Tx sectors of the first wireless communication station, the CF-END frame to indicate an end of the TxOP.

Example 45 includes the subject matter of any one of Examples 33-44, and optionally, comprising transmitting the SU-MIMO transmission via the plurality of SU-MIMO Tx sectors of the first wireless communication station.

Example 46 includes the subject matter of any one of Examples 33-45, and optionally, comprising transmitting the SU-MIMO transmission over a frequency band above 45 Gigahertz (GHz).

Example 47 includes the subject matter of any one of Examples 33-46, and optionally, wherein the RTS comprises a Directional Multi-Gigabit (DMG) RTS frame, the CTS comprises a DMG CTS frame, and the SU-MIMO transmission comprises an Enhanced DMG (EDMG) SU-MIMO transmission.

Example 48 includes a product comprising one or more tangible computer-readable non-transitory storage media comprising computer-executable instructions operable to, when executed by at least one processor, enable the at least one processor to cause a first wireless communication station to transmit a Request to Send (RTS) to a second wireless communication station via a plurality of Single-User (SU) Multiple-Input-Multiple-Output (MIMO) Transmit (Tx) sectors of the first wireless communication station, the RTS to establish a Transmit Opportunity (TXOP) to transmit an SU-MIMO transmission to the second wireless communication station, a control trailer of the RTS comprising an indication of an intent to transmit the SU-MIMO transmission to the second wireless communication station; and transmit the SU-MIMO transmission to the second wireless communication station, upon receipt of a Clear to Send (CTS) from the second wireless communication station indicating that the second wireless communication station is ready to receive the SU-MIMO transmission.

Example 49 includes the subject matter of Example 48, and optionally, wherein a control trailer of the CTS comprises a mode indication to indicate whether the second wireless communication station is to use a Single Input Single Output (SISO) mode or a SU-MIMO mode to transmit a reverse direction transmission to the first wireless communication station.

Example 50 includes the subject matter of Example 49, and optionally, wherein the instructions, when executed, cause the first wireless communication station to receive from the second wireless communication station an acknowledgment of the SU-MIMO transmission according to the mode indication in the control trailer of the CTS.

Example 51 includes the subject matter of Example 50, and optionally, wherein the instructions, when executed, cause the first wireless communication station to receive the acknowledgment from the second wireless communication station via a plurality of SU-MIMO Receive (Rx) sectors of the first wireless communication station, when the mode indication in the control trailer of the CTS indicates a SU-MIMO mode.

Example 52 includes the subject matter of Example 50 or 51, and optionally, wherein the instructions, when executed, cause the first wireless communication station to receive the acknowledgment from the second wireless communication station as a SISO transmission, when the mode indication in the control trailer of the CTS indicates a SISO mode.

Example 53 includes the subject matter of any one of Examples 48-52, and optionally, wherein the instructions, when executed, cause the first wireless communication station to receive a Denial to Send (DTS) from the second wireless communication station to indicate failure of establishment of the TXOP, a control trailer of the DTS to indicate a reason for the failure.

Example 54 includes the subject matter of any one of Examples 48-53, and optionally, wherein the instructions, when executed, cause the first wireless communication station to transmit a grant frame to the second wireless communication station, the grant frame comprising an indication of a time for the TXOP, a control trailer of the grant frame comprising the indication of the intent to transmit the SU-MIMO transmission to the second wireless communication station.

Example 55 includes the subject matter of Example 54, and optionally, wherein the instructions, when executed, cause the first wireless communication station to receive a grant acknowledge (ACK) from the second wireless communication station, the grant ACK to acknowledge reception of the grant frame, a control trailer of the grant ACK to indicate whether the second wireless communication station is ready to receive the SU-MIMO transmission.

Example 56 includes the subject matter of Example 55, and optionally, wherein the control trailer of the grant ACK comprises a mode indication to indicate whether the second wireless communication station is to use a Single Input Single Output (SISO) mode or a SU-MIMO mode to transmit a reverse direction transmission to the first wireless communication station.

Example 57 includes the subject matter of any one of Examples 48-56, and optionally, wherein the instructions, when executed, cause the first wireless communication station to be ready to receive a reverse direction SU-MIMO transmission from the second wireless communication station, based on indicating the intent of the first wireless communication station to transmit the SU-MIMO transmission to the second wireless communication station.

Example 58 includes the subject matter of any one of Examples 48-56, and optionally, wherein the instructions, when executed, cause the first wireless communication station to include in the control trailer of the RTS an indication on whether the first wireless communication station is to be ready to receive a reverse direction SU-MIMO transmission from the second wireless communication station.

Example 59 includes the subject matter of any one of Examples 48-58, and optionally, wherein the instructions, when executed, cause the first wireless communication station to transmit a Contention-Free End (CF-END) frame via the plurality of SU-MIMO Tx sectors of the first wireless communication station, the CF-END frame to indicate an end of the TxOP.

Example 60 includes the subject matter of any one of Examples 48-59, and optionally, wherein the instructions, when executed, cause the first wireless communication station to transmit the SU-MIMO transmission via the plurality of SU-MIMO Tx sectors of the first wireless communication station.

Example 61 includes the subject matter of any one of Examples 48-60, and optionally, wherein the instructions, when executed, cause the first wireless communication station to transmit the SU-MIMO transmission over a frequency band above 45 Gigahertz (GHz).

Example 62 includes the subject matter of any one of Examples 48-61, and optionally, wherein the RTS comprises a Directional Multi-Gigabit (DMG) RTS frame, the CTS comprises a DMG CTS frame, and the SU-MIMO transmission comprises an Enhanced DMG (EDMG) SU-MIMO transmission.

Example 63 includes an apparatus of wireless communication by a first wireless communication station, the apparatus comprising means for transmitting a Request to Send (RTS) to a second wireless communication station via a plurality of Single-User (SU) Multiple-Input-Multiple-Output (MIMO) Transmit (Tx) sectors of the first wireless communication station, the RTS to establish a Transmit Opportunity (TXOP) to transmit an SU-MIMO transmission to the second wireless communication station, a control trailer of the RTS comprising an indication of an intent to transmit the SU-MIMO transmission to the second wireless communication station; and means for transmitting the SU-MIMO transmission to the second wireless communication station, upon receipt of a Clear to Send (CTS) from the second wireless communication station indicating that the second wireless communication station is ready to receive the SU-MIMO transmission.

Example 64 includes the subject matter of Example 63, and optionally, wherein a control trailer of the CTS comprises a mode indication to indicate whether the second wireless communication station is to use a Single Input Single Output (SISO) mode or a SU-MIMO mode to transmit a reverse direction transmission to the first wireless communication station.

Example 65 includes the subject matter of Example 64, and optionally, comprising means for receiving from the second wireless communication station an acknowledgment of the SU-MIMO transmission according to the mode indication in the control trailer of the CTS.

Example 66 includes the subject matter of Example 65, and optionally, comprising means for receiving the acknowledgment from the second wireless communication station via a plurality of SU-MIMO Receive (Rx) sectors of the first wireless communication station, when the mode indication in the control trailer of the CTS indicates a SU-MIMO mode.

Example 67 includes the subject matter of Example 65 or 66, and optionally, comprising means for receiving the acknowledgment from the second wireless communication station as a SISO transmission, when the mode indication in the control trailer of the CTS indicates a SISO mode.

Example 68 includes the subject matter of any one of Examples 63-67, and optionally, comprising means for receiving a Denial to Send (DTS) from the second wireless communication station to indicate failure of establishment of the TXOP, a control trailer of the DTS to indicate a reason for the failure.

Example 69 includes the subject matter of any one of Examples 63-68, and optionally, comprising means for transmitting a grant frame to the second wireless communication station, the grant frame comprising an indication of a time for the TXOP, a control trailer of the grant frame comprising the indication of the intent to transmit the SU-MIMO transmission to the second wireless communication station.

Example 70 includes the subject matter of Example 69, and optionally, comprising means for receiving a grant acknowledge (ACK) from the second wireless communication station, the grant ACK to acknowledge reception of the grant frame, a control trailer of the grant ACK to indicate whether the second wireless communication station is ready to receive the SU-MIMO transmission.

Example 71 includes the subject matter of Example 70, and optionally, wherein the control trailer of the grant ACK comprises a mode indication to indicate whether the second wireless communication station is to use a Single Input Single Output (SISO) mode or a SU-MIMO mode to transmit a reverse direction transmission to the first wireless communication station.

Example 72 includes the subject matter of any one of Examples 63-71, and optionally, comprising means for being ready to receive a reverse direction SU-MIMO transmission from the second wireless communication station, based on indicating the intent of the first wireless communication station to transmit the SU-MIMO transmission to the second wireless communication station.

Example 73 includes the subject matter of any one of Examples 63-71, and optionally, comprising means for including in the control trailer of the RTS an indication on whether the first wireless communication station is to be ready to receive a reverse direction SU-MIMO transmission from the second wireless communication station.

Example 74 includes the subject matter of any one of Examples 63-73, and optionally, comprising means for transmitting a Contention-Free End (CF-END) frame via the plurality of SU-MIMO Tx sectors of the first wireless communication station, the CF-END frame to indicate an end of the TxOP.

Example 75 includes the subject matter of any one of Examples 63-74, and optionally, comprising means for transmitting the SU-MIMO transmission via the plurality of SU-MIMO Tx sectors of the first wireless communication station.

Example 76 includes the subject matter of any one of Examples 63-75, and optionally, comprising means for transmitting the SU-MIMO transmission over a frequency band above 45 Gigahertz (GHz).

Example 77 includes the subject matter of any one of Examples 63-76, and optionally, wherein the RTS comprises a Directional Multi-Gigabit (DMG) RTS frame, the CTS comprises a DMG CTS frame, and the SU-MIMO transmission comprises an Enhanced DMG (EDMG) SU-MIMO transmission.

Example 78 includes an apparatus comprising logic and circuitry configured to cause a first wireless communication station to receive a Request to Send (RTS) from a second wireless communication station, a control trailer of the RTS comprising an indication of an intent to transmit a Single-User (SU) Multiple-Input-Multiple-Output (MIMO) transmission to the first wireless communication station; transmit a Clear to Send (CTS) to the second wireless communication station, when the first wireless communication station is ready to receive the SU-MIMO transmission; and receive the SU-MIMO transmission from the second wireless communication station.

Example 79 includes the subject matter of Example 78, and optionally, wherein a control trailer of the CTS comprises a mode indication to indicate whether the first wireless communication station is to use a Single Input Single Output (SISO) mode or a SU-MIMO mode to transmit a reverse direction transmission to the second wireless communication station.

Example 80 includes the subject matter of Example 79, and optionally, wherein the apparatus is configured to cause the first wireless communication station to transmit the CTS via a plurality of SU-MIMO Transmit (Tx) sectors of the first wireless communication station, when the mode indication in the control trailer of the CTS is to indicate the SU-MIMO mode.

Example 81 includes the subject matter of Example 79 or 80, and optionally, wherein the apparatus is configured to cause the first wireless communication station to transmit the CTS as a SISO transmission, when the mode indication in the control trailer of the CTS is to indicate the SISO mode.

Example 82 includes the subject matter of any one of Examples 79-81, and optionally, wherein the apparatus is configured to cause the first wireless communication station to transmit to the second wireless communication station an acknowledgment of the SU-MIMO transmission according to the mode indication in the control trailer of the CTS.

Example 83 includes the subject matter of any one of Examples 79-82, and optionally, wherein the apparatus is configured to cause the first wireless communication station to transmit to the second wireless communication station the reverse direction transmission according to the mode indication in the control trailer of the CTS.

Example 84 includes the subject matter of any one of Examples 78-83, and optionally, wherein the apparatus is configured to cause the first wireless communication station to transmit a Denial to Send (DTS) to the second wireless communication station to indicate failure of establishment of a Transmit Opportunity (TXOP) for communicating the SU-MIMO transmission, a control trailer of the DTS to indicate a reason for the failure.

Example 85 includes the subject matter of any one of Examples 78-84, and optionally, wherein the apparatus is configured to cause the first wireless communication station to receive a Contention-Free End (CF-END) frame from the second wireless communication station, the CF-end frame to indicate an end of a Transmit Opportunity (TXOP) for communicating the SU-MIMO transmission.

Example 86 includes the subject matter of any one of Examples 78-85, and optionally, wherein the apparatus is configured to cause the first wireless communication station to receive a grant frame from the second wireless communication station, the grant frame comprising an indication of a time for a Transmit Opportunity (TXOP) for communicating the SU-MIMO transmission, a control trailer of the grant frame comprising the indication of the intent to transmit the SU-MIMO transmission to the first wireless communication station.

Example 87 includes the subject matter of Example 86, and optionally, wherein the apparatus is configured to cause the first wireless communication station to transmit a grant acknowledge (ACK) to the second wireless communication station, the grant ACK to acknowledge reception of the grant frame, a control trailer of the grant ACK to indicate whether the first wireless communication station is ready to receive the SU-MIMO transmission from the second wireless communication station.

Example 88 includes the subject matter of Example 87, and optionally, wherein the control trailer of the grant ACK comprises a mode indication to indicate whether the first wireless communication station is to use a Single Input Single Output (SISO) mode or a SU-MIMO mode to transmit a reverse direction transmission to the second wireless communication station.

Example 89 includes the subject matter of any one of Examples 78-88, and optionally, wherein the control trailer of the RTS comprises an indication on whether the second wireless communication station is to be ready to receive a reverse direction SU-MIMO transmission from the first wireless communication station.

Example 90 includes the subject matter of any one of Examples 78-88, and optionally, wherein the apparatus is configured to allow the first wireless communication station to transmit a reverse direction SU-MIMO transmission to the second wireless communication station, when the RTS comprises the indication of the intent to transmit the SU-MIMO transmission to the first wireless communication station.

Example 91 includes the subject matter of any one of Examples 78-90, and optionally, wherein the apparatus is configured to cause the first wireless communication station to receive the SU-MIMO transmission over a frequency band above 45 Gigahertz (GHz).

Example 92 includes the subject matter of any one of Examples 78-91, and optionally, wherein the RTS comprises a Directional Multi-Gigabit (DMG) RTS frame, the CTS comprises a DMG CTS frame, and the SU-MIMO transmission comprises an Enhanced DMG (EDMG) SU-MIMO transmission.

Example 93 includes the subject matter of any one of Examples 78-92, and optionally, comprising a radio.

Example 94 includes the subject matter of any one of Examples 78-93, and optionally, comprising one or more antennas.

Example 95 includes a system of wireless communication comprising a first wireless communication station, the first wireless communication station comprising one or more antennas; a radio; a memory; a processor; and a controller configured to cause the first wireless communication station to receive a Request to Send (RTS) from a second wireless communication station, a control trailer of the RTS comprising an indication of an intent to transmit a Single-User (SU) Multiple-Input-Multiple-Output (MIMO) transmission to the first wireless communication station; transmit a Clear to Send (CTS) to the second wireless communication station, when the first wireless communication station is ready to receive the SU-MIMO transmission; and receive the SU-MIMO transmission from the second wireless communication station.

Example 96 includes the subject matter of Example 95, and optionally, wherein a control trailer of the CTS comprises a mode indication to indicate whether the first wireless communication station is to use a Single Input Single Output (SISO) mode or a SU-MIMO mode to transmit a reverse direction transmission to the second wireless communication station.

Example 97 includes the subject matter of Example 96, and optionally, wherein the controller is configured to cause the first wireless communication station to transmit the CTS via a plurality of SU-MIMO Transmit (Tx) sectors of the first wireless communication station, when the mode indication in the control trailer of the CTS is to indicate the SU-MIMO mode.

Example 98 includes the subject matter of Example 96 or 97, and optionally, wherein the controller is configured to cause the first wireless communication station to transmit the CTS as a SISO transmission, when the mode indication in the control trailer of the CTS is to indicate the SISO mode.

Example 99 includes the subject matter of any one of Examples 96-98, and optionally, wherein the controller is configured to cause the first wireless communication station to transmit to the second wireless communication station an acknowledgment of the SU-MIMO transmission according to the mode indication in the control trailer of the CTS.

Example 100 includes the subject matter of any one of Examples 96-99, and optionally, wherein the controller is configured to cause the first wireless communication station to transmit to the second wireless communication station the reverse direction transmission according to the mode indication in the control trailer of the CTS.

Example 101 includes the subject matter of any one of Examples 95-100, and optionally, wherein the controller is configured to cause the first wireless communication station to transmit a Denial to Send (DTS) to the second wireless communication station to indicate failure of establishment of a Transmit Opportunity (TXOP) for communicating the SU-MIMO transmission, a control trailer of the DTS to indicate a reason for the failure.

Example 102 includes the subject matter of any one of Examples 95-101, and optionally, wherein the controller is configured to cause the first wireless communication station to receive a Contention-Free End (CF-END) frame from the second wireless communication station, the CF-end frame to indicate an end of a Transmit Opportunity (TXOP) for communicating the SU-MIMO transmission.

Example 103 includes the subject matter of any one of Examples 95-102, and optionally, wherein the controller is configured to cause the first wireless communication station to receive a grant frame from the second wireless communication station, the grant frame comprising an indication of a time for a Transmit Opportunity (TXOP) for communicating the SU-MIMO transmission, a control trailer of the grant frame comprising the indication of the intent to transmit the SU-MIMO transmission to the first wireless communication station.

Example 104 includes the subject matter of Example 103, and optionally, wherein the controller is configured to cause the first wireless communication station to transmit a grant acknowledge (ACK) to the second wireless communication station, the grant ACK to acknowledge reception of the grant frame, a control trailer of the grant ACK to indicate whether the first wireless communication station is ready to receive the SU-MIMO transmission from the second wireless communication station.

Example 105 includes the subject matter of Example 104, and optionally, wherein the control trailer of the grant ACK comprises a mode indication to indicate whether the first wireless communication station is to use a Single Input Single Output (SISO) mode or a SU-MIMO mode to transmit a reverse direction transmission to the second wireless communication station.

Example 106 includes the subject matter of any one of Examples 95-105, and optionally, wherein the control trailer of the RTS comprises an indication on whether the second wireless communication station is to be ready to receive a reverse direction SU-MIMO transmission from the first wireless communication station.

Example 107 includes the subject matter of any one of Examples 95-105, and optionally, wherein the controller is configured to allow the first wireless communication station to transmit a reverse direction SU-MIMO transmission to the second wireless communication station, when the RTS comprises the indication of the intent to transmit the SU-MIMO transmission to the first wireless communication station.

Example 108 includes the subject matter of any one of Examples 95-107, and optionally, wherein the controller is configured to cause the first wireless communication station to receive the SU-MIMO transmission over a frequency band above 45 Gigahertz (GHz).

Example 109 includes the subject matter of any one of Examples 95-108, and optionally, wherein the RTS comprises a Directional Multi-Gigabit (DMG) RTS frame, the CTS comprises a DMG CTS frame, and the SU-MIMO transmission comprises an Enhanced DMG (EDMG) SU-MIMO transmission.

Example 110 includes a method to be performed at a first wireless communication station, the method comprising receiving a Request to Send (RTS) from a second wireless communication station, a control trailer of the RTS comprising an indication of an intent to transmit a Single-User (SU) Multiple-Input-Multiple-Output (MIMO) transmission to the first wireless communication station; transmitting a Clear to Send (CTS) to the second wireless communication station, when the first wireless communication station is ready to receive the SU-MIMO transmission; and receiving the SU-MIMO transmission from the second wireless communication station.

Example 111 includes the subject matter of Example 110, and optionally, wherein a control trailer of the CTS comprises a mode indication to indicate whether the first wireless communication station is to use a Single Input Single Output (SISO) mode or a SU-MIMO mode to transmit a reverse direction transmission to the second wireless communication station.

Example 112 includes the subject matter of Example 111, and optionally, comprising transmitting the CTS via a plurality of SU-MIMO Transmit (Tx) sectors of the first wireless communication station, when the mode indication in the control trailer of the CTS is to indicate the SU-MIMO mode.

Example 113 includes the subject matter of Example 111 or 112, and optionally, comprising transmitting the CTS as a SISO transmission, when the mode indication in the control trailer of the CTS is to indicate the SISO mode.

Example 114 includes the subject matter of any one of Examples 111-113, and optionally, comprising transmitting to the second wireless communication station an acknowledgment of the SU-MIMO transmission according to the mode indication in the control trailer of the CTS.

Example 115 includes the subject matter of any one of Examples 111-114, and optionally, comprising transmitting to the second wireless communication station the reverse direction transmission according to the mode indication in the control trailer of the CTS.

Example 116 includes the subject matter of any one of Examples 110-115, and optionally, comprising transmitting a Denial to Send (DTS) to the second wireless communication station to indicate failure of establishment of a Transmit Opportunity (TXOP) for communicating the SU-MIMO transmission, a control trailer of the DTS to indicate a reason for the failure.

Example 117 includes the subject matter of any one of Examples 110-116, and optionally, comprising receiving a Contention-Free End (CF-END) frame from the second wireless communication station, the CF-end frame to indicate an end of a Transmit Opportunity (TXOP) for communicating the SU-MIMO transmission.

Example 118 includes the subject matter of any one of Examples 110-117, and optionally, comprising receiving a grant frame from the second wireless communication station, the grant frame comprising an indication of a time for a Transmit Opportunity (TXOP) for communicating the SU-MIMO transmission, a control trailer of the grant frame comprising the indication of the intent to transmit the SU-MIMO transmission to the first wireless communication station.

Example 119 includes the subject matter of Example 118, and optionally, comprising transmitting a grant acknowledge (ACK) to the second wireless communication station, the grant ACK to acknowledge reception of the grant frame, a control trailer of the grant ACK to indicate whether the first wireless communication station is ready to receive the SU-MIMO transmission from the second wireless communication station.

Example 120 includes the subject matter of Example 119, and optionally, wherein the control trailer of the grant ACK comprises a mode indication to indicate whether the first wireless communication station is to use a Single Input Single Output (SISO) mode or a SU-MIMO mode to transmit a reverse direction transmission to the second wireless communication station.

Example 121 includes the subject matter of any one of Examples 110-120, and optionally, wherein the control trailer of the RTS comprises an indication on whether the second wireless communication station is to be ready to receive a reverse direction SU-MIMO transmission from the first wireless communication station.

Example 122 includes the subject matter of any one of Examples 110-120, and optionally, comprising transmitting a reverse direction SU-MIMO transmission to the second wireless communication station, when the RTS comprises the indication of the intent to transmit the SU-MIMO transmission to the first wireless communication station.

Example 123 includes the subject matter of any one of Examples 110-122, and optionally, comprising receiving the SU-MIMO transmission over a frequency band above 45 Gigahertz (GHz).

Example 124 includes the subject matter of any one of Examples 110-123, and optionally, wherein the RTS comprises a Directional Multi-Gigabit (DMG) RTS frame, the CTS comprises a DMG CTS frame, and the SU-MIMO transmission comprises an Enhanced DMG (EDMG) SU-MIMO transmission.

Example 125 includes a product comprising one or more tangible computer-readable non-transitory storage media comprising computer-executable instructions operable to, when executed by at least one computer processor, enable the at least one computer processor to cause a first wireless communication station to receive a Request to Send (RTS) from a second wireless communication station, a control trailer of the RTS comprising an indication of an intent to transmit a Single-User (SU) Multiple-Input-Multiple-Output (MIMO) transmission to the first wireless communication station; transmit a Clear to Send (CTS) to the second wireless communication station, when the first wireless communication station is ready to receive the SU-MIMO transmission; and receive the SU-MIMO transmission from the second wireless communication station.

Example 126 includes the subject matter of Example 125, and optionally, wherein a control trailer of the CTS comprises a mode indication to indicate whether the first wireless communication station is to use a Single Input Single Output (SISO) mode or a SU-MIMO mode to transmit a reverse direction transmission to the second wireless communication station.

Example 127 includes the subject matter of Example 126, and optionally, wherein the instructions, when executed, cause the first wireless communication station to transmit the CTS via a plurality of SU-MIMO Transmit (Tx) sectors of the first wireless communication station, when the mode indication in the control trailer of the CTS is to indicate the SU-MIMO mode.

Example 128 includes the subject matter of Example 126 or 127, and optionally, wherein the instructions, when executed, cause the first wireless communication station to transmit the CTS as a SISO transmission, when the mode indication in the control trailer of the CTS is to indicate the SISO mode.

Example 129 includes the subject matter of any one of Examples 126-128, and optionally, wherein the instructions, when executed, cause the first wireless communication station to transmit to the second wireless communication station an acknowledgment of the SU-MIMO transmission according to the mode indication in the control trailer of the CTS.

Example 130 includes the subject matter of any one of Examples 126-129, and optionally, wherein the instructions, when executed, cause the first wireless communication station to transmit to the second wireless communication station the reverse direction transmission according to the mode indication in the control trailer of the CTS.

Example 131 includes the subject matter of any one of Examples 125-130, and optionally, wherein the instructions, when executed, cause the first wireless communication station to transmit a Denial to Send (DTS) to the second wireless communication station to indicate failure of establishment of a Transmit Opportunity (TXOP) for communicating the SU-MIMO transmission, a control trailer of the DTS to indicate a reason for the failure.

Example 132 includes the subject matter of any one of Examples 125-131, and optionally, wherein the instructions, when executed, cause the first wireless communication station to receive a Contention-Free End (CF-END) frame from the second wireless communication station, the CF-end frame to indicate an end of a Transmit Opportunity (TXOP) for communicating the SU-MIMO transmission.

Example 133 includes the subject matter of any one of Examples 125-132, and optionally, wherein the instructions, when executed, cause the first wireless communication station to receive a grant frame from the second wireless communication station, the grant frame comprising an indication of a time for a Transmit Opportunity (TXOP) for communicating the SU-MIMO transmission, a control trailer of the grant frame comprising the indication of the intent to transmit the SU-MIMO transmission to the first wireless communication station.

Example 134 includes the subject matter of Example 133, and optionally, wherein the instructions, when executed, cause the first wireless communication station to transmit a grant acknowledge (ACK) to the second wireless communication station, the grant ACK to acknowledge reception of the grant frame, a control trailer of the grant ACK to indicate whether the first wireless communication station is ready to receive the SU-MIMO transmission from the second wireless communication station.

Example 135 includes the subject matter of Example 134, and optionally, wherein the control trailer of the grant ACK comprises a mode indication to indicate whether the first wireless communication station is to use a Single Input Single Output (SISO) mode or a SU-MIMO mode to transmit a reverse direction transmission to the second wireless communication station.

Example 136 includes the subject matter of any one of Examples 125-135, and optionally, wherein the control trailer of the RTS comprises an indication on whether the second wireless communication station is to be ready to receive a reverse direction SU-MIMO transmission from the first wireless communication station.

Example 137 includes the subject matter of any one of Examples 125-135, and optionally, wherein the instructions, when executed, allow the first wireless communication station to transmit a reverse direction SU-MIMO transmission to the second wireless communication station, when the RTS comprises the indication of the intent to transmit the SU-MIMO transmission to the first wireless communication station.

Example 138 includes the subject matter of any one of Examples 125-137, and optionally, wherein the instructions, when executed, cause the first wireless communication station to receive the SU-MIMO transmission over a frequency band above 45 Gigahertz (GHz).

Example 139 includes the subject matter of any one of Examples 125-138, and optionally, wherein the RTS comprises a Directional Multi-Gigabit (DMG) RTS frame, the CTS comprises a DMG CTS frame, and the SU-MIMO transmission comprises an Enhanced DMG (EDMG) SU-MIMO transmission.

Example 140 includes an apparatus of wireless communication by a first wireless communication station, the apparatus comprising means for receiving a Request to Send (RTS) from a second wireless communication station, a control trailer of the RTS comprising an indication of an intent to transmit a Single-User (SU) Multiple-Input-Multiple-Output (MIMO) transmission to the first wireless communication station; means for transmitting a Clear to Send (CTS) to the second wireless communication station, when the first wireless communication station is ready to receive the SU-MIMO transmission; and means for receiving the SU-MIMO transmission from the second wireless communication station.

Example 141 includes the subject matter of Example 140, and optionally, wherein a control trailer of the CTS comprises a mode indication to indicate whether the first wireless communication station is to use a Single Input Single Output (SISO) mode or a SU-MIMO mode to transmit a reverse direction transmission to the second wireless communication station.

Example 142 includes the subject matter of Example 141, and optionally, comprising means for transmitting the CTS via a plurality of SU-MIMO Transmit (Tx) sectors of the first wireless communication station, when the mode indication in the control trailer of the CTS is to indicate the SU-MIMO mode.

Example 143 includes the subject matter of Example 141 or 142, and optionally, comprising means for transmitting the CTS as a SISO transmission, when the mode indication in the control trailer of the CTS is to indicate the SISO mode.

Example 144 includes the subject matter of any one of Examples 141-143, and optionally, comprising means for transmitting to the second wireless communication station an acknowledgment of the SU-MIMO transmission according to the mode indication in the control trailer of the CTS.

Example 145 includes the subject matter of any one of Examples 141-144, and optionally, comprising means for transmitting to the second wireless communication station the reverse direction transmission according to the mode indication in the control trailer of the CTS.

Example 146 includes the subject matter of any one of Examples 140-145, and optionally, comprising means for transmitting a Denial to Send (DTS) to the second wireless communication station to indicate failure of establishment of a Transmit Opportunity (TXOP) for communicating the SU-MIMO transmission, a control trailer of the DTS to indicate a reason for the failure.

Example 147 includes the subject matter of any one of Examples 140-146, and optionally, comprising means for receiving a Contention-Free End (CF-END) frame from the second wireless communication station, the CF-end frame to indicate an end of a Transmit Opportunity (TXOP) for communicating the SU-MIMO transmission.

Example 148 includes the subject matter of any one of Examples 140-147, and optionally, comprising means for receiving a grant frame from the second wireless communication station, the grant frame comprising an indication of a time for a Transmit Opportunity (TXOP) for communicating the SU-MIMO transmission, a control trailer of the grant frame comprising the indication of the intent to transmit the SU-MIMO transmission to the first wireless communication station.

Example 149 includes the subject matter of Example 148, and optionally, comprising means for transmitting a grant acknowledge (ACK) to the second wireless communication station, the grant ACK to acknowledge reception of the grant frame, a control trailer of the grant ACK to indicate whether the first wireless communication station is ready to receive the SU-MIMO transmission from the second wireless communication station.

Example 150 includes the subject matter of Example 149, and optionally, wherein the control trailer of the grant ACK comprises a mode indication to indicate whether the first wireless communication station is to use a Single Input Single Output (SISO) mode or a SU-MIMO mode to transmit a reverse direction transmission to the second wireless communication station.

Example 151 includes the subject matter of any one of Examples 140-150, and optionally, wherein the control trailer of the RTS comprises an indication on whether the second wireless communication station is to be ready to receive a reverse direction SU-MIMO transmission from the first wireless communication station.

Example 152 includes the subject matter of any one of Examples 140-150, and optionally, comprising means for transmitting a reverse direction SU-MIMO transmission to the second wireless communication station, when the RTS comprises the indication of the intent to transmit the SU-MIMO transmission to the first wireless communication station.

Example 153 includes the subject matter of any one of Examples 140-152, and optionally, comprising means for receiving the SU-MIMO transmission over a frequency band above 45 Gigahertz (GHz).

Example 154 includes the subject matter of any one of Examples 140-153, and optionally, wherein the RTS comprises a Directional Multi-Gigabit (DMG) RTS frame, the CTS comprises a DMG CTS frame, and the SU-MIMO transmission comprises an Enhanced DMG (EDMG) SU-MIMO transmission.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
    memory circuitry; and
    a processor configured to cause a first Enhanced Directional Multi-Gigabit (EDMG) wireless communication station (STA) to:
        transmit to a second EDMG STA a grant frame to indicate an intent to transmit a Multiple-Input-Multiple-Output (MIMO) Physical layer (PHY) Protocol Data Unit (PPDU) to the second EDMG STA, wherein a control trailer of the grant frame is configured to indicate that a transmission to the second EDMG STA is to be a Single-User (SU) MIMO (SU-MIMO) transmission; and
        process a grant Acknowledgement (Ack) frame from the second EDMG STA to indicate that the second EDMG STA is able to receive the SU-MIMO transmission.

2. The apparatus of claim 1 configured to cause the first EDMG STA to set a Single-Input-Single-Output (SISO)/MIMO (SISO/MIMO) field in the control trailer to "1" and to set a SU/Multi-user (MU) MIMO field in the control trailer to "0" to indicate that the transmission to the second EDMG STA is to be the SU-MIMO transmission.

3. The apparatus of claim 1 configured to cause the first EDMG STA to set the control trailer of the grant frame to indicate an antenna configuration for the SU-MIMO transmission.

4. The apparatus of claim 1 configured to cause the first EDMG STA to set an allocation duration field and a duration field of the grant frame to indicate a time when the first EDMG STA is intended to initiate MIMO channel access to transmit to the second EDMG STA.

5. The apparatus of claim 1 configured to cause the first EDMG STA to set a value of an allocation duration field and a value of a duration field of the grant frame such that a sum of the value of the allocation duration field and the value of the duration field is to indicate a time offset of a time when the first EDMG STA is intended to initiate channel access to transmit to the second EDMG STA.

6. The apparatus of claim 5, wherein the time offset is from a PHY Transmit end indication (PHY-TXENDindication) of a transmission of the grant frame.

7. The apparatus of claim 1 configured to cause the first EDMG STA to process a control trailer of the grant Ack frame to determine whether the second EDMG STA is to use a Single-Input-Single-Output (SISO) mode or a SU-MIMO mode to transmit a transmission to the first EDMG STA.

8. The apparatus of claim 7 configured to cause the first EDMG STA to process a SISO/MIMO field in the control trailer of the grant Ack frame, wherein a setting of the SISO/MIMO field is to indicate whether the second EDMG STA is to use the SISO mode or the SU-MIMO mode for the transmission to the first EDMG STA.

9. The apparatus of claim 7 configured to cause the first EDMG STA to determine that the second EDMG STA is to use the SU-MIMO mode for the transmission to the first EDMG STA based on a determination that a SISO/MIMO field in the control trailer of the grant Ack frame is "1".

10. The apparatus of claim 7 configured to cause the first EDMG STA to determine that the second EDMG STA is to use the SISO mode for the transmission to the first EDMG STA based on a determination that a SISO/MIMO field in the control trailer of the grant Ack frame is "0".

11. The apparatus of claim 1 configured to cause the first EDMG STA to transmit the grant frame based on a grant required field with a value "1" in a capabilities element from the second EDMG STA.

12. The apparatus of claim 1 comprising a radio, the processor configured to cause the radio to transmit the grant frame from the first EDMG STA.

13. The apparatus of claim 12 comprising one or more antennas connected to the radio, and another processor to execute instructions of an operating system.

14. A product comprising one or more tangible computer-readable non-transitory storage media comprising instructions operable to, when executed by at least one processor, enable the at least one processor to cause a first Enhanced Directional Multi-Gigabit (EDMG) wireless communication station (STA) to:
    transmit to a second EDMG STA a grant frame to indicate an intent to transmit a Multiple-Input-Multiple-Output (MIMO) Physical layer (PHY) Protocol Data Unit (PPDU) to the second EDMG STA, wherein a control trailer of the grant frame is configured to indicate that a transmission to the second EDMG STA is to be a Single-User (SU) MIMO (SU-MIMO) transmission; and
    process a grant Acknowledgement (Ack) frame from the second EDMG STA to indicate that the second EDMG STA is able to receive the SU-MIMO transmission.

15. The product of claim 14, wherein the instructions, when executed, cause the first EDMG STA to set a Single-Input-Single-Output (SISO)/MIMO (SISO/MIMO) field in the control trailer to "1" and to set a SU/Multi-user (MU) MIMO field in the control trailer to "0" to indicate that the transmission to the second EDMG STA is to be the SU-MIMO transmission.

16. The product of claim 14, wherein the instructions, when executed, cause the first EDMG STA to set the control trailer of the grant frame to indicate an antenna configuration for the SU-MIMO transmission.

17. The product of claim 14, wherein the instructions, when executed, cause the first EDMG STA to set an allocation duration field and a duration field of the grant frame to indicate a time when the first EDMG STA is intended to initiate MIMO channel access to transmit to the second EDMG STA.

18. The product of claim 14, wherein the instructions, when executed, cause the first EDMG STA to process a control trailer of the grant Ack frame to determine whether the second EDMG STA is to use a Single-Input-Single-Output (SISO) mode or a SU-MIMO mode to transmit a transmission to the first EDMG STA.

19. An apparatus comprising:
    means for causing a first Enhanced Directional Multi-Gigabit (EDMG) wireless communication station (STA) to transmit to a second EDMG STA a grant frame to indicate an intent to transmit a Multiple-Input-Multiple-Output (MIMO) Physical layer (PHY) Protocol Data Unit (PPDU) to the second EDMG STA, wherein a control trailer of the grant frame is configured to indicate that a transmission to the second EDMG STA is to be a Single-User (SU) MIMO (SU-MIMO) transmission; and means for processing a grant Acknowledgement (Ack) frame from the second EDMG STA to indicate that the second EDMG STA is able to receive the SU-MIMO transmission.

20. The apparatus of claim 19 comprising means for causing the first EDMG STA to process a control trailer of the grant Ack frame to determine whether the second EDMG STA is to use a Single-Input-Single-Output (SISO) mode or a SU-MIMO mode to transmit a transmission to the first EDMG STA.

* * * * *